United States Patent
Capp et al.

(10) Patent No.: US 8,008,804 B2
(45) Date of Patent: Aug. 30, 2011

(54) METHODS, SYSTEMS AND APPARATUS FOR REGULATING FREQUENCY OF GENERATED POWER USING FLYWHEEL ENERGY STORAGE SYSTEMS WITH VARYING LOAD AND/OR POWER GENERATION

(75) Inventors: F. William Capp, Minneapolis, MN (US); Matthew L. Lazarewicz, Boxford, MA (US); A. James Arseneaux, Westford, MA (US); Paul Dresens, Wayland, MA (US); Hernan Alex Rojas, Salem, NH (US)

(73) Assignee: Beacon Power Corporation, Tyngsboro, MA (US)

( * ) Notice: Subject to any disclaimer, the term of this patent is extended or adjusted under 35 U.S.C. 154(b) by 0 days.

(21) Appl. No.: 10/920,146

(22) Filed: Aug. 16, 2004

(65) Prior Publication Data
US 2005/0077881 A1    Apr. 14, 2005

(51) Int. Cl.
*H02J 3/38* (2006.01)
*H02J 3/00* (2006.01)

(52) U.S. Cl. .............. 307/44; 307/80; 307/85
(58) Field of Classification Search .......... 307/80, 307/85, 44
See application file for complete search history.

(56) References Cited

U.S. PATENT DOCUMENTS

| 3,667,012 A | * | 5/1972 | Kilgore | ............ 318/161 |
| 5,798,633 A | | 8/1998 | Larsen et al. | |
| 5,917,251 A | * | 6/1999 | Schermann et al. | ............ 307/20 |
| 6,023,152 A | | 2/2000 | Briest et al. | |
| 6,262,505 B1 | | 7/2001 | Hockney et al. | |

FOREIGN PATENT DOCUMENTS

| EP | 0 872 942 A2 | | 10/1998 |
| EP | 1 271 741 A2 | | 1/2003 |
| JP | 6-284583 | | 10/1994 |
| JP | 06-284583 A | * | 10/1994 |
| JP | 2000-014013 | | 1/2000 |

OTHER PUBLICATIONS

Akagi, H.; "Active filters and energy storage systems operated under non-periodic conditions," Power Engineering Society Summer Meeting, 2000. IEEE vol. 2, Jul. 16-20, 2000 pp. 965-970 vol. 2.*
Hampton, D.E. Tindall, C.E. McArdle, J.M.; "Emergency control of power system frequency using flywheel energy injection," Advances in Power System Control, Operation and Management, 1991. APSCOM-91., 1991 International Conference on Nov. 1991 pp. 662-667.*
Bornemann, H.J. Sander, M.; "Conceptual system design of a 5 MWh/100 MW superconducting flywheel energy storage plant for power utility applications," Applied Superconductivity, IEEE Transactions on vol. 7, Issue 2, Part 1, Jun. 1997 pp. 398-401.*
English Abstrat for JP 06-284583 A.*

(Continued)

*Primary Examiner* — Jared J Fureman
*Assistant Examiner* — Dru M Parries
(74) *Attorney, Agent, or Firm* — Pritzkau Patent Group, LLC

(57) ABSTRACT

Featured are methods for regulating the AC frequency of the electrical power be supplied on an electrical distribution system or grid. Such a method includes electrically coupling an energy storage sub-system to the electrical distribution network, where the energy storage sub-system includes one or more flywheel energy storage systems. Also featured as devices, systems and apparatuses embodying such methodologies or for use in implementing such methodologies of the present invention.

26 Claims, 24 Drawing Sheets

OTHER PUBLICATIONS

Akagi, H., "Active filters and energy storage systems operated under non-periodic conditions," Power Engineering Society Summer Meeting, 2000, IEEE, vol. 2, Jul. 16-20, 2000, pp. 965-970.

Hampton, D.E. Tindall, C.E. McArdle, J.M., "Emergency control of power system frequency using flywheel energy injection," Advances in Power System Control, Operation and Management, 1991. APSCOM-91. 1991 International Conference on Nov. 1991, pp. 662-667.

Bornemann, H.J. Sander, M.: "Conceptual system design of a 5 MWh/100 MW superconducting flywheel energy storage plant for power utility applications," Applied Superconductivity, IEEE Transactions on vol. 7, Issue 2, Part 1, Jun. 1997, pp. 398-401.

* cited by examiner

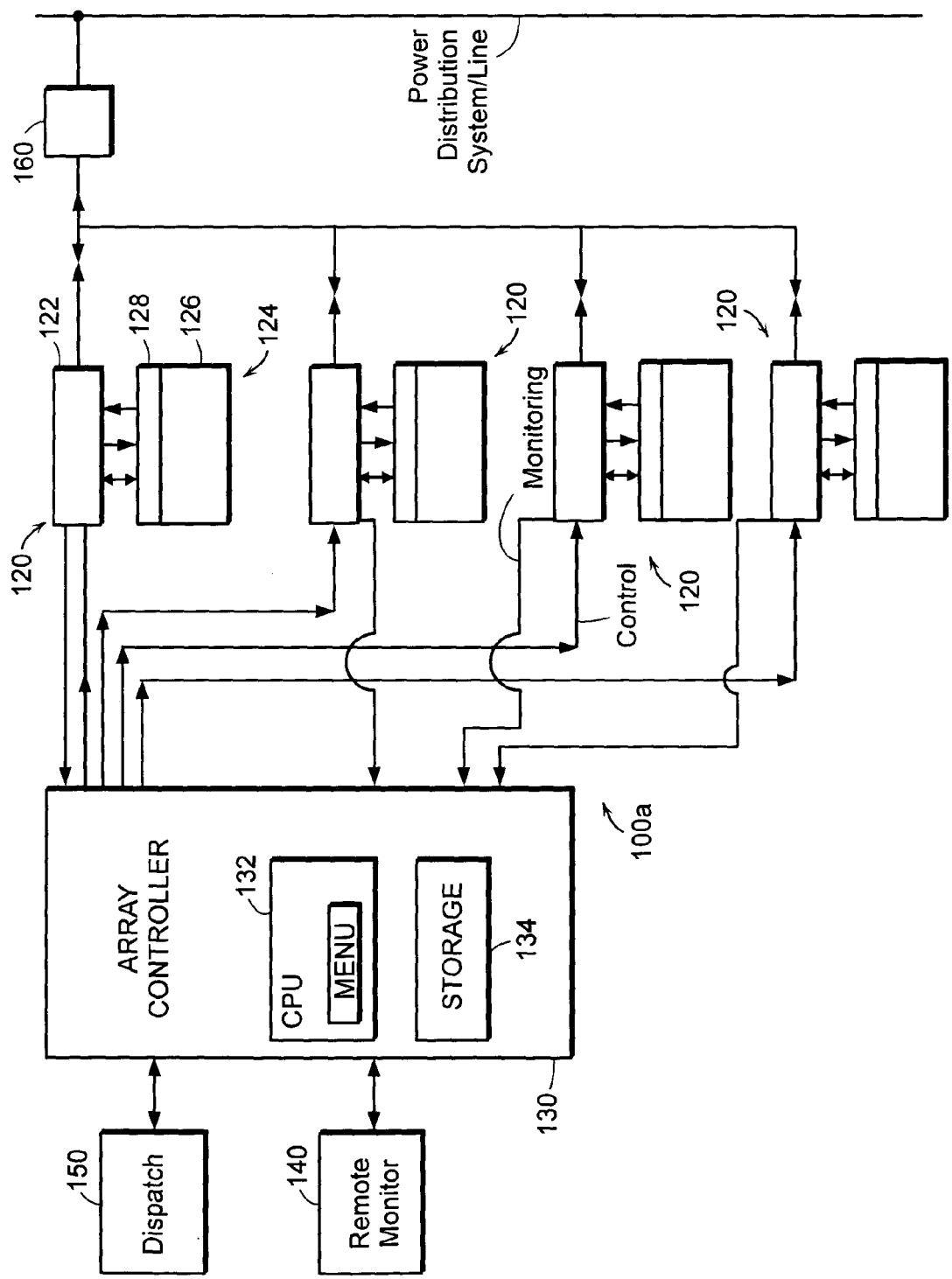

METHODS, SYSTEMS AND APPARATUS FOR REGULATING FREQUENCY OF GENERATED POWER USING FLYWHEEL ENERGY STORAGE SYSTEMS WITH VARYING LOAD AND/OR POWER GENERATION

FIELD OF INVENTION

The present invention relates to methods, systems and apparatuses for regulating the frequency of the generated power when the load and/or generated power is subject to variation as a function of time, in particular methods, systems and apparatuses for regulating frequency of generated electrical power when the load and/or power being generated varies as a function of time and more particularly, methods, systems and apparatuses for regulating frequency of generated electrical power when the load and/or power being generated varies as a function of time using one or more flywheel energy storage systems.

BACKGROUND OF THE INVENTION

In the United States, electric power is generated so as to provide an AC voltage in a desired voltage range and at a desired frequency, 60 Hz. Such power is generated by anyone of a number of power generation plants or power generation methods including for example large fixed electrical power generation facilities using fossil fuel (e.g., natural gas, coal, or fuel oil) or nuclear energy to generate electricity, hydroelectric power generation facilities, and pumped hydroelectric power generation facilities. The particular mixture of electrical power generation facilities that are to be operated at any given time are selected based on cost and other factors including regulating the grid voltage as to be within a desired range and regulating the frequency of the AC voltage so as to be at or about the desired frequency.

There is shown in FIG. 1A, an exemplary daily load curve that illustrates the variation as a function of time of the electrical load that is created by users and imposed on the electrical grid or electrical generation and distribution system that interconnects the power generation facilities and the various electrical load sources. Such electrical load sources include households, businesses, manufacturing facilities, computer facilities, and transportation services (e.g., mass transit systems powered by electricity). Although the curve illustrated in FIG. 1A suggests that the load changes occur over a large time period, in actuality load changes are extremely rapid (e.g., sub-second) as the various electrical power users or consumers adjust their individual electrical power requirements. There is shown in FIG. 1B an exemplary load curve that illustrates the short-term variation in the daily load illustrated in FIG. 1A between the hours of midnight and 3 AM.

Because of such short-term variations that occur in the electrical load imposed on the electrical generation and distribution system and because the ability of a generator to follow such load variations is typically much slower than the time period of the load variation, the electrical generation and distribution system is constantly challenged with a mismatch between the load and the power being generated. As is known in the art, when the electrical load exceeds the total power being generated, the system the AC frequency drops. Alternatively, when the total power being generated exceeds the electrical load requirement, the frequency rises.

There is shown in FIG. 2, an exemplary curve that illustrates the variation in AC frequency as a function of time over a 24 hour time period. As illustrated, the mean AC frequency is 60.002 Hz, the maximum AC frequency is 60.063 Hz, and the minimum AC frequency is 59.944 Hz. In a number of applications, such changes in AC frequency cannot be tolerated and so the power producer or consumer must install a system that is interconnected to the input from the electrical output generation and distribution system and that locally regulates the AC frequency so as to be within a desired range or at a desired value.

Consequently, the power output of the electrical generation equipment is being constantly adjusted so as to match the total power being consumed by or lost to the transmission and distribution and consumed by the customer load(s). In order to keep both the voltage and AC frequency within desired limits and/or ranges, the difference between the load and the power being generated is determined periodically and this difference is used to increase or decrease the output of the generators/power generation facilities. In this regard, and as known to those skilled in the art, real power generation/absorption is associated with frequency regulation and reactive power generation/absorption is associated with voltage regulation.

More particularly, a regional dispatching location or center is tasked with monitoring load and power generation as well as other factors (e.g., correction for frequency shift or time error) and outputs a control/dispatch signal (e.g., sometimes referred to as an energy management system (EMS) signal) to one or more generators/power generation facilities to increase or decrease the power output of such generators/power generation facilities. According to one technique, a large number of monitoring points or nodes are defined for a given area and the dispatching location or center monitors each of the monitoring points as to the foregoing factors. In addition and as described further herein, such a determination also can result in additional generating capacity being brought on-line so as to increase the total generating capacity of the power generation and distribution system or to take on-line generating capacity off-line, or put it in a standby on-line condition, so as to decrease the total generating capacity of the power generation and distribution system.

For example, a determination is made of the difference between the load and power generation, and a control/correction signal is outputted periodically (e.g., every 2-4 seconds) to the power generator/power generation facility(s). Because of the time lag associated with increasing or decreasing power by a given power generator, however, the effect on power generation by the signal being in outputted is delayed in time. There is shown in FIGS. 3A,B, generation and load curves that illustrate the responsiveness of a fossil-fuel power generator (FIG. 3A) and a pumped Hydro power generator (FIG. 3B) to a varying load.

As implemented in most electric power grids, regulation is a function or parameter that involves the use of on-line generation that is equipped with automatic generation control (AGC) and that can change output quickly (MW/minute) to track the moment-to-moment fluctuations in customer loads and to correct for the unintended fluctuations in generation. In so doing, regulation helps to maintain interconnection frequency, manage differences between actual and scheduled power flows between control areas, and match generation to load within the control area. Regulation requires faster response than can be obtained from units responding to market signals alone. Generators offer capacity that can be controlled by the system operator's AGC system to balance the power system.

One methodology for determining the amount of regulatory power demand uses an area control error (ACE) score. Such a method typically determines the ACE by comparing the power being delivered and the power required. In addition, the ACE being generated can also take into consideration corrections for frequency shift and/or other minor corrections such as a time error and a manual adjustment. In this method, as the ACE value rises or lowers, the regulation power being provided is adjusted accordingly. A low ACE score typically means that the power generation in distribution system is close to optimal operation from the standpoint of AC frequency. There is shown in FIG. 3C, an illustration of an algorithm of one technique for determining an ACE.

Control areas are not able and not required to perfectly match generation and load. The National Electricity Reliability Council (NERC) has established the Control Performance Standard (CPS) to determine the amount of imbalance that is permissible for reliability purposes. CPS1 measures the relationship between the control area's area control error (ACE) and the interconnection frequency on a 1-minute average basis. NERC requires control areas to restore the generation/load balance within 15 minutes. Reserve service definitions require full reserve response within 10 minutes. The additional 5 minutes is provided for the system operator to assess the situation and respond.

CPS1 values can be either "good" or "bad." When frequency is above its reference value, under-generation benefits the interconnection by lowering frequency and leads to a good CPS1 value. Over-generation at such times, however, would further increase frequency and lead to a bad CPS1 value. CPS1, although recorded every minute, is evaluated and reported on an annual basis. NERC sets minimum CPS1 requirements that each control area must exceed each year.

CPS2, a monthly performance standard, sets control-area-specific limits on the maximum average ACE for every 10-minute period. Control areas are permitted to exceed the CPS2 limit no more than 10% of the time. This 90% requirement means that a control area can have no more than 14.4 CPS2 violations per day, on average, during any month.

Typically, approximately one percent (1%) of the power being transmitted and/or capable of being generated and delivered to the utility grid or electrical distribution system is reserved to fine tune or regulate the AC frequency of the electrical power being distributed. Such a source of electrical power is typically maintained in an on-line status with respect to the generation and distribution system, so as to be capable of supplying electric power at full capacity typically within at least a predetermined time period of a request for such power production. In present day applications the predetermined time period is typically about five minutes. Also, present regulatory standards for the generation of electrical power (e.g., standards set by FERC or NERC) require that the distribution system be balanced at least once every ten minutes and that over time the over and under generation nets to zero (0). As a result the correction typically can command a generator to alternatively load and then un-load hundreds of time a day. Although such a mode of operation is achievable with some types of power generating facilities, such a mode of operation has a negative impact on the life and overall deficiency of a typical fossil-fueled electrical generator (e.g., gas turbine powered electric generator).

In some cases, battery farms have been established and configured so as to have electrical capacities on the order of 500 kW to about 40 MW. While batteries are used to form an un-interruptible power supply, cyclical operation of a battery such as that undergone when performing fine tune regulation of AC frequency can prove to be damaging to the battery, including affecting operational life as well as the battery storage capacity.

In addition, the power dispatcher also can use the determined power difference to determine if supplemental or replacement reserve capacities should be brought on-line to increase the power generation capability of the power generation and distribution system. For major deviations from the desired or nominal AC frequency (e.g. 60 Hz), the dispatcher would output a signal and/or a request to bring spinning reserves that are typically on-line up to power and/or a signal/request to bring supplemental, and/or replacement reserve capacity on-line. Such reserves are typically capable of providing larger blocks of power as a complement to the power sources utilized for fine tuning of the AC frequency, however, such reserves typically take a longer time to reach full capacity (e.g., on the order of 10-15 or 30-60 minutes) and thus are not practically speaking useable for the fine tune regulation of AC frequency.

It thus would be desirable to provide new methods, systems and apparatuses for regulating AC frequency of the electrical power being generated. It would be particularly desirable to provide such methods, systems and apparatuses that can regulate AC frequency with a faster response as compared to conventional/prior art methods, systems and apparatuses and in a environment where load changes are highly variable or cyclical. It also would be particularly desirable to provide such methods, systems and apparatuses that embody one or more flywheel energy storage systems as the mechanism for regulating AC frequency. It also would be particularly desirable to provide such methods, systems and apparatuses that embody one or more flywheel energy storage systems in combination with a switchable load as a mechanism for regulating AC frequency. It also would be particularly desirable for such methods, systems and apparatuses to be adapted for use with existing methodologies, systems and apparatuses for determining and/or correcting for the difference between power generation and load. It also would be particularly desirable for such systems and apparatuses to be easily integrated or adapted for use with existing electrical power distribution systems.

SUMMARY OF THE INVENTION

The present invention features methods for regulating, more particularly the fine tune regulation, of the AC frequency of the electrical power be supplied on an electrical distribution system or grid. Also featured are devices, systems and apparatuses embodying such methodologies or for use in implementing such methodologies of the present invention.

According to one aspect of the present invention, there is featured a method for controlling AC frequency of the electrical power being distributed to an electrical power distribution network, which network is connected to one or more loads and to one or more power sources. Such a method includes electrically coupling an energy storage sub-system to the electrical distribution network, where the energy storage sub-system includes one or more flywheel energy storage systems and controlling the operation of each of the flywheel energy storage systems, responsive to total power being outputted by the one or more power sources and a total load imposed by the one or more loads and line losses associated with the transmission and distribution network, so the electrical storage subsystem outputs an amount of electrical energy to the electrical distribution network so as to regulate the AC frequency of the electrical power being distributed to the electrical distribution network so as to be at or about a desired AC frequency. The energy storage subsystems can be located at one or more locations throughout the transmission and distribution network, at load sites and at generating facilities so as to regulate AC frequency.

In more particular embodiments, the energy storage sub-system includes a plurality or more of flywheel energy storage systems, a multiplicity or more of flywheel energy storage systems, four or more flywheel energy storage systems, 4 to 10 flywheel energy storage systems, 10 flywheel energy storage systems, 10 or more flywheel energy storage systems that are electrically coupled to electrical distribution network. The number of flywheel energy storage systems making up the energy storage sub-system and thus being electrically coupled to the electrical distribution network, is sufficient so the so-configured energy storage sub-system or the array of flywheel energy storage systems should provide the desired power output for the desired amount of time and at the desired output voltage. In more specific embodiments, the method includes arranging the flywheel energy storage systems at a given location so as to form an array of such flywheel energy storage systems and wherein the array is electrically coupled to the electrical distribution network.

In more particular embodiments, such a frequency control method includes controlling the operation of each of the flywheel energy storage systems so as to reduce the amount of power being outputted to the electrical distribution network by the energy storage sub-system a determined amount, when the total power being outputted by the one or more power sources exceeds the total load imposed by the one or more loads and the line losses associated with the transmission and distribution network. In addition, the flywheel energy storage systems can be operated so as to draw power from the distribution network when there is an excess of electrical power that is being generated. In this way, the energy storage sub-system can absorb at least a portion of the excess electrical energy being generated.

Such a frequency control method also includes increasing the amount of power being outputted to the electrical distribution network by the energy storage sub-system by another determined amount, when the total power being outputted is less than the total load. Stated another way, the flywheel energy storage systems can be operated so as to provide electrical power to the distribution network when the electrical power being generated is less than that required to power all the loads that are connected to the network and to account for line losses. In such a case, the another determined amount is determined by evaluating a difference between the total power and the total load. Because of the controllability of the flywheel energy storage systems, the energy storage sub-system can be controlled so as to control the amount of energy being distributed to or being drawn from the network.

In the foregoing, the determined amount and the another determined amount are determined by evaluating a difference between the total power and the total power consumed (i.e., load plus line losses). In more particular embodiments, the difference between the total power and the total load is determined periodically and said controlling includes controlling operation of each of the one or more flywheel energy storage systems responsive to the periodically determined difference.

In yet another embodiment, the frequency control methodology includes determining a difference between the total power being outputted by the one or more power sources and the total load imposed by the one or more loads. Such a methodology also includes controlling the operation of each of the flywheel energy storage systems of the energy storage sub-system so as to maintain the AC frequency at or about a desired value by one of: increasing power being outputted by one or more flywheel energy storage systems when the determined difference is a negative value, or decreasing power being outputted by the one or more FESS energy storage sub-system when the determined difference is a positive value.

In further embodiments, a frequency control methodology according to the present invention includes electrically coupling a plurality of energy storage sub-systems to the electrical distribution network and separately controlling each of the energy storage sub-systems so as to one of deliver electrical power to the electrical distribution network or absorb electrical power from the electrical distribution network. In further embodiments, such a methodology includes controllably operating the flywheel energy storage systems of each of the plurality of energy storage sub-systems so as to alternatively deliver electrical power to the electrical distribution network and absorb electrical power from the electrical distribution network. In this way, one can use the flywheel energy storage systems that have given up energy to the electrical distribution network as an energy sink for absorbing the excess electrical power being generated.

In yet further embodiments, the energy storage sub-system includes a plurality or more of flywheel energy storage systems and the methodology of the present invention includes separately operating each of the plurality of flywheel the energy storage systems so as to operate selective ones of the plurality of flywheel energy storage systems to deliver electrical energy to or absorb electrical energy from the electrical distribution network. For example, one or more of the plurality or more flywheel energy storage systems can be operated to deliver or absorb electrical energy and the other of the plurality or more flywheel energy storage systems can be operated in a free-spin or a standby operating mode, where energy is not being delivered or absorbed by the other flywheel energy storage systems.

In another aspect of the present invention, the energy storage sub-system comprises an adjustable load and the flywheel energy storage systems. In more particular embodiments, the frequency regulating methodology of the present invention includes configuring the plurality or more of flywheel energy storage systems and the adjustable load so that one or both of them absorbs electrical energy from the electrical distribution network. In this way, excess electrical energy being generated is temporarily absorbed by the one or more, or the plurality or more, flywheel energy storage systems of a given energy storage sub-system and/or provided to the adjustable load.

The adjustable load can comprise a sink or a soft load that can be relatively easily unloaded and re-loaded from the energy storage subsystem. For example, the sink or soft load could be a resistive heating element that is separately coupled to the distribution grid. Thus, the absorbed electrical energy is separately and controllably delivered to the resistive heating element so as to provide useable heat energy or heat energy that is dumped to a heat sink (e.g., atmosphere). In another example, the soft load is another device, apparatus or system such as a pump or chiller unit where the other device, apparatus or system can use the excess energy as useable electrically energy (e.g., make ice, pump a fluid). The adjustable load can be established so as to be capable of absorbing electrical energy equal to that capable of being absorbed by the flywheel energy storage systems or the pre-established maximum absorption capability for the energy storage sub-system. In more particular embodiments, the adjustable load is set so as to absorb an amount of energy equal to about 100% or less of the pre-established maximum absorption capability for the energy storage sub-system, more specifically about 50% 40%, 30%, 20% or 10% of the pre-established maximum absorption capability.

In further aspects of the present invention, the methodology of the present invention includes establishing a set point corresponding to a predetermined amount of electrical energy, the set point corresponding to a predetermined percentage of the maximum capability of the energy storage sub-system to absorb or provide electrical power. The predetermined percentage is about 20%, about 30% and being about 50% or less.

In further embodiments, the methodology of the present invention includes configuring the energy storage sub-system so that power delivery and absorption is determined based on the set point. In more particular embodiments, the methodology further includes absorbing power from the distribution network equal to the set point using the adjustable load.

In further embodiments, when delivering power to the distribution network the methodology includes diverting power from the adjustable load and delivering power equal to the set point to the distribution network and using power from the flywheel energy storage systems to meet additional power requirements. In further embodiments, when absorbing power from the distribution network, the methodology includes configuring the energy storage subsystem so as to absorb power from one or both of the adjustable load and the flywheel energy storage systems. In a more particular embodiment, the methodology includes evaluating the capacity of the flywheel energy storage systems to absorb energy and controlling the adjustable load to complement the capacity of the flywheel energy storage systems.

Other aspects and embodiments of the invention are discussed below.

BRIEF DESCRIPTION OF THE DRAWING

For a fuller understanding of the nature and desired objects of the present invention, reference is made to the following detailed description taken in conjunction with the accompanying drawing figures wherein like reference character denote corresponding parts throughout the several views and wherein:

FIG. 6 is a block diagram of an exemplary FESS array according to one aspect of the present invention with four FESS units;

DESCRIPTION OF THE PREFERRED EMBODIMENT

Figure 4:
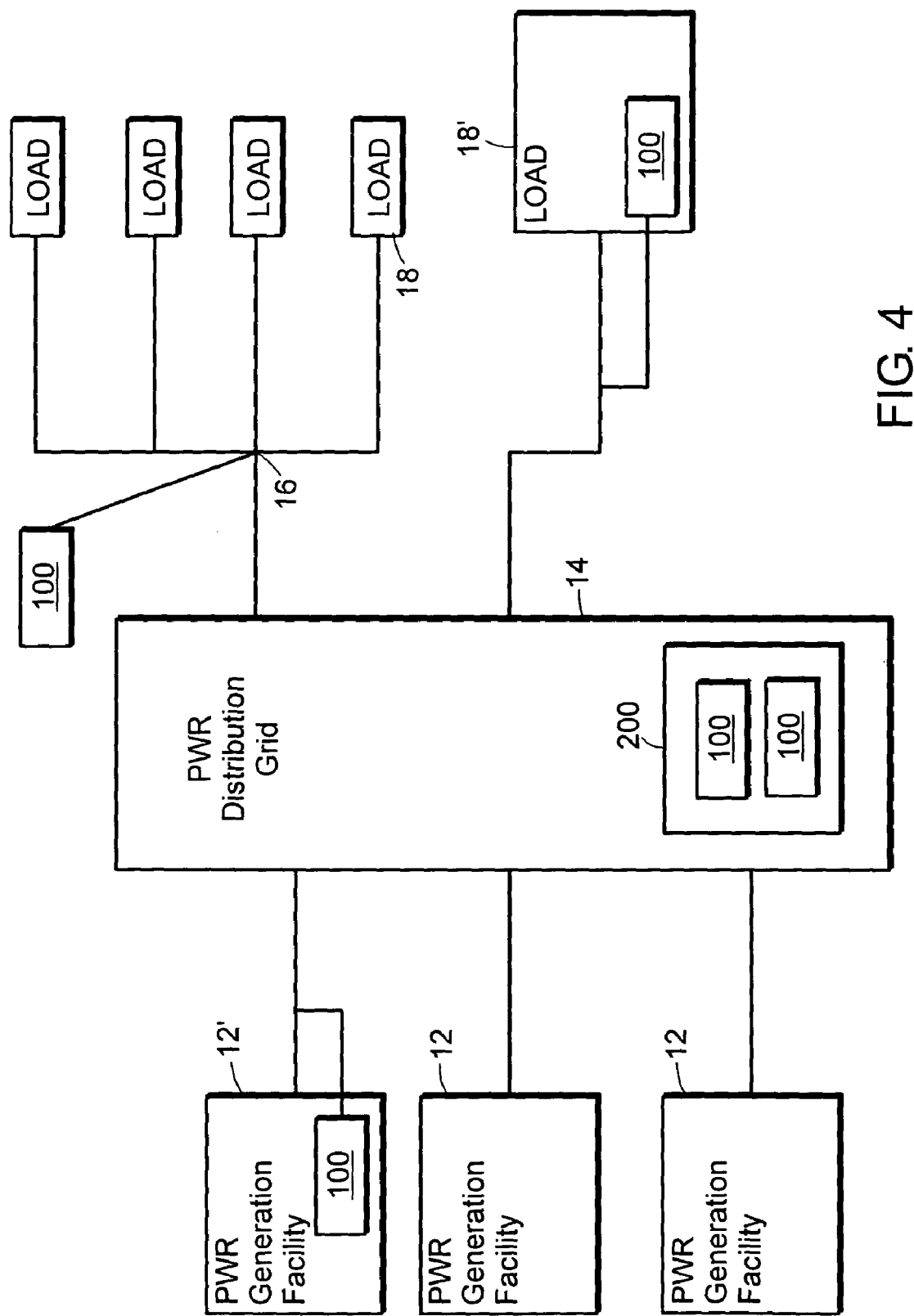
FIG. 4 is a block diagram of an exemplary power generation and distribution system illustrating various placements of an FESS array of the present invention.

Referring now to the various figures of the drawing wherein like reference characters refer to like parts, there is shown in FIG. 4 a block diagram of an exemplary power generation and distribution system 10 coupled to any one of a number of system loads 18, 18' (e.g., loads imposed by customers or users) and which illustrates various placements of an FESS array 100 of the present invention within such a system. The exemplary power generation and distribution system 10 includes one or more power generation facilities 12, 12' that are selectively and electrically coupled to the power distribution grid 14 using any of a number of techniques known to those skilled in the art. Such power generation facilities 12, 12' includes fixed sites, such as fixed fossil-fuel or nuclear power generation facilities, hydroelectric power generation facilities; battery farms; pumped hydro power generation facilities; diesel generators, or green (e.g., wind powered or solar powered) power generation facilities. The power generation facility 12, 12' also can be configured so as to be generally mobile so as to be re-locatable and electrically coupled to any one of a node or point in a distribution system.

An FESS array(s) 100 according to the present invention can be located at any of a number of locations within the power generation and distribution system 10. In one illustrative embodiment, an FESS array 100 is located at or proximal a power generation facility 12' and coupled to the distribution grid 14 at that location. In another illustrative embodiment, a FESS array sub-system 200 that includes a plurality or more of FESS arrays 100 is located in the power distribution grid 14 and is electrically coupled thereto. In another illustrative embodiment, an FESS array 100 is located at or proximal a node 16 or other connective point of a power distribution system that feeds one or more loads 18. In another illustrative embodiment, an FESS array 100 is located at or proximal the site of a load 18' (e.g., a large manufacturing facility).

The foregoing is illustrative of a few general locations within the power generation and system 10 where an FESS array 100 or an FESS array sub-system 200 can be located. This shall not, however, be construed as limiting the FESS array 100 or the FESS array sub-system 200 to the illustrated locations as it is contemplated and within the scope of the present invention for the FESS array or FESS array sub-system to be located anywhere within a power generation and distribution system by which frequency regulation can be accomplished as taught herein. In use, the power generation and distribution system 10 is configured and arranged with one or more FESS arrays 100 or one or more FESS array sub-systems 200 having sufficient power capacity so as to effect regulation of the AC frequency of the power being transmitted in the system alone or in combination with other power generation facilities.

Figure 5:
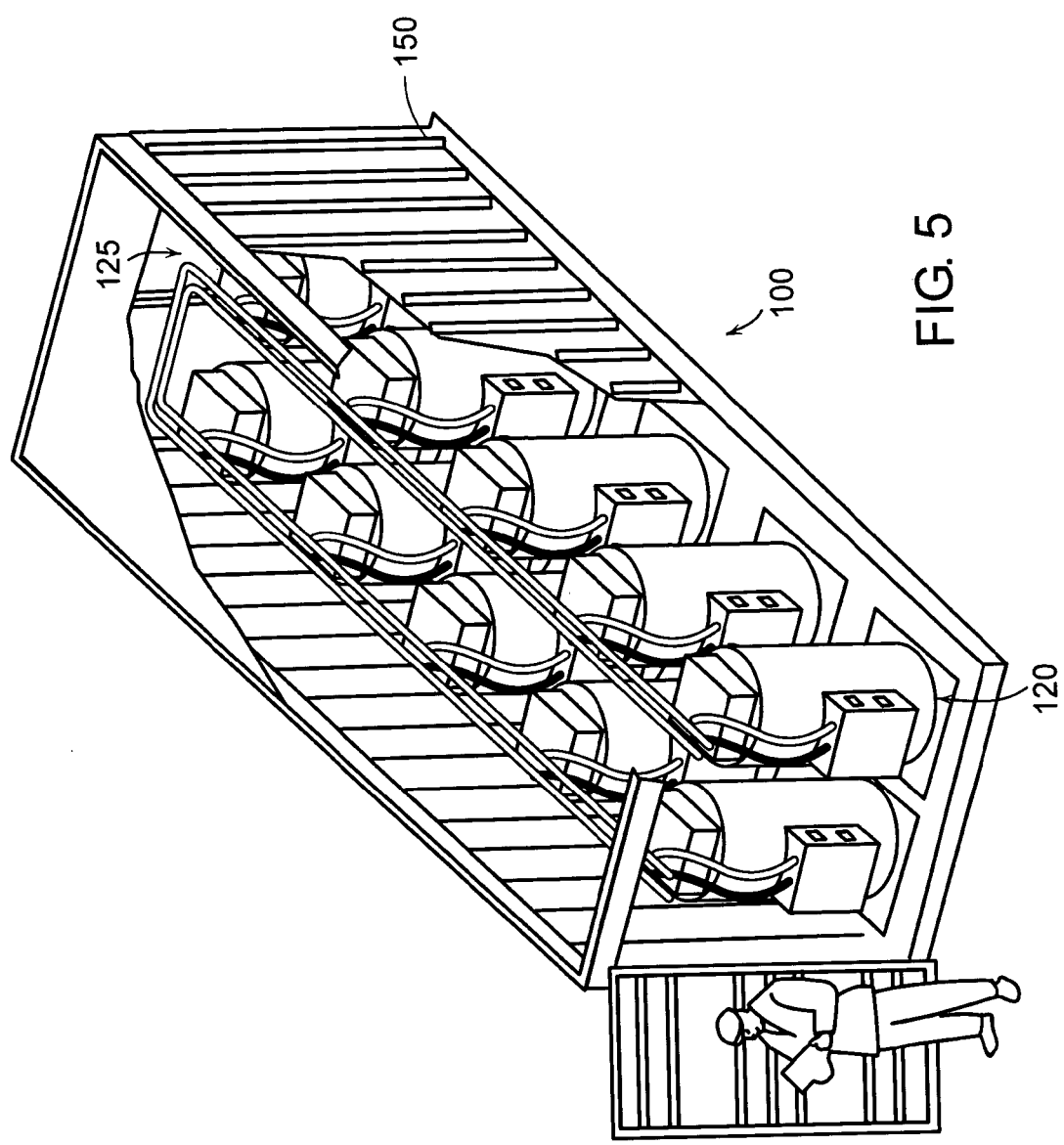
FIG. 5 is a perspective view of an exemplary FESS array of the present invention.

Referring now to FIG. 5, there is shown a perspective view of a partial cutaway of an exemplary FESS array 100 according to the present invention. In the illustrated embodiment, the FESS array 100 includes one or more flywheel energy storage system (FESS) units 120 as is known in the art, more particularly a plurality or more FESS units, and more specifically a multiplicity of FESS units. In the illustrated embodiment, the FESS array 100 is configured so the array of FESS units 120 can be enclosed in a housing 150 or structure. Such a housing 150 or structure provides a mechanism by which the FESS array 100 can be constructed at a remote location and then moved to the desired location for use instead of being constructed on-site. Also enclosed within the housing 150 are the cabinets or modules 125 of the electronics associated with the operation of the array, power conditioning and other systems (e.g., HVAC) related to operation of the array and/or the structure. This shall not be construed as limiting the present invention, as an FESS array 100 according to the present invention can be arranged on-site in a fixed configuration. In addition, it also is contemplated that an FESS array 100 of the present invention to be disposed within a mobile housing, for example a semi-tractor trailer unit (e.g., box), whereby the mobile housing can be moved from location to location by a motor vehicle such as a truck and/or a train.

It should be recognized that the number of FESS units 100 that make up a given FESS array is dependent upon a number of factors including, but not limited to, the total energy to be developed or delivered by the FESS array, the amount of energy that can be delivered per unit time by the FESS array, the time period such power is to be delivered by the FESS array, the total amount of energy that can be delivered by each FESS unit, the amount of energy that can be delivered per unit time by each FESS unit, whether the array is configured so as to be mobile (e.g., transportable) or a non-mobile design, and the room or space available at the site at which the FESS array is to be located.

In illustrative embodiments, FESS units 120 contemplated for use in an FESS array of the present invention each have electrical capacities ranging from about 1 kW to about 250 kW. It should not be construed that the electrical capacities of each FESS unit 120 is limited to the illustrative values, as the electrical capacity can be of any value including, but not limited to, 500 Kw or less or 500 Kw or more. In a particular exemplary illustrative embodiment, the FESS array 100 is configured and arranged so as to include 10 FESS units 120, where each FESS unit is capable of providing about 25 kWh of electrical energy. The so-configured FFSS array 100 can provide about 1 MW of electrical power for 15 minutes or about 2.5 MW of electrical power for about 5 minutes. It also is contemplated and within the scope of the present invention for an FESS array 100 to be made up of FESS units 120 having different power producing capabilities.

In addition to controlling the number of FESS units 120 making up an FESS array 100, the present invention also contemplates locating an FESS array sub-system 200, made up of a plurality of more of FESS arrays, at a given location as is illustrated in FIG. 4. This shall not be construed as limiting an FESS array sub-system 200 to any specific number of FESS arrays 100, as a FESS array sub-system of the present invention is scalable so as to include any of a number of FESS arrays and thus scalable to provide any desired amount of power including an FESS array sub-system comprised of 40 FESS arrays at a given location. Using the above, exemplary illustrative embodiment, an FESS array sub-system 200 made up of 2 FESS arrays 100 can provide about 2 MW of electrical power for 15 minutes or about 5 MW of electrical power for about 5 minutes. It also is contemplated and within the scope of the present invention for an FESS array sub-system 200 to be made up of FESS arrays 100 having different configurations, such different number and power level types of FESS units 120, as well as FESS arrays 100 having different power producing capabilities. As indicated herein it also is within the scope of the present invention that the individual FESS units making up an FESS array 100 be controlled so as to provided or absorb power altogether or on an individual basis. As indicated herein it also is within the scope of the present invention that the individual FESS arrays 100 of an FESS array sub-system 200 be controlled so as to provided or absorb power altogether or separately.

Referring now to FIG. 6, there is shown is a block diagram of an exemplary FESS array 100*a* with four FESS units 120 and an array controller 130. As indicated above, an FESS array according to the present invention can include one or more FESS units, a plurality or more of FESS units, a multiplicity or more of FESS units, four or more FESS units, 4 to 10 FESS units, 10 FESS units, or 10 or more FESS units, where the number of FESS units making up the FESS array is sufficient so the so-configured array should provide the desired power output for the desired amount of time and at the desired output voltage. As indicated herein, a number of such arrays 100*a* can be ganged or arranged in a substation connected to a common AC bus so the combined array can output and/or absorb more electrical power than if a single array was provided. In addition, such multiple arrays also can be arranged as further described herein so as to maintain the capability to absorb electrical energy and provide or inject electrical energy into the electrical distribution grid.

The FESS units 120 are any of a number of flywheel energy storage systems known to those skilled in the art, which are generally characterized by the ability of each flywheel energy storage system to store electrical energy in the form of kinetic energy typically by use of a rotating member and to convert the stored kinetic energy into electrical energy on demand. One conventional flywheel energy storage system, such as that described in U.S. Pat. No. 6,262,505 the teachings of which are incorporated herein by reference, includes an electronics module or flywheel controller 122, and a flywheel module 124. The flywheel module includes a flywheel/rotor assembly 126 and a motor/generator 128 that is mechanically coupled to the flywheel/rotor assembly. The flywheel module 120 constitutes the actual mechanical motor/generator system that is typically based on a permanent-magnet-brushless design and this electromechanical system is typically controlled and monitored by the flywheel controller 122. It is contemplated and thus within the scope of the present invention for the mechanical motor/generator system to comprise any of a number of other motor type designs including, but not limited to, reluctance motors and inductance motors. Such a flywheel energy storage system also is enclosed within a housing that is maintained under vacuum conditions so as to minimize retarding forces on the flywheel rotor assembly.

Such a flywheel energy storage system is generally operated in one of three major operating modes, a charging mode, a standby mode and a power generation or producing mode, however, other operating modes or states for regulation of frequency are contemplated and thus within the scope of the present invention as more particularly described hereinafter. In the charging mode, the flywheel controller 122 configures the motor/generator 128 so as to function as a motor and connects the motor/generator to a source of electrical power. The electrical power is used by the motor/generator/128 so as to spin the flywheel/rotor assembly such that the rotor or flywheel reaches a predetermined minimum rotational speed or a rotational speed that is in a desired range of rotational speeds. In this way, electrical power being delivered to the flywheel energy storage system is converted to kinetic energy. Upon reaching or attaining the predetermined initial rotational speed or a rotational speed in the desired range, the flywheel controller 122 disconnects the motor/generator from the source of electrical power.

After completion of charging, the flywheel is operated in a standby mode, where the flywheel/rotor assembly 126 is maintained in a generally continuing rotational state. The flywheel/rotor assembly 126 is typically enclosed within a housing (not shown) that is maintained under vacuum conditions and the rotor/flywheel utilize bearings that are generally characterized as being frictionless or having minimally frictional effect. In this way, retarding forces that could act on the flywheel/rotor of the flywheel/rotor assembly when in the standby mode are thereby minimized.

After an FESS unit 120 is put into its initial operating (i.e., spinning) state, the flywheel controller 122 monitors the operational condition of the FESS unit, including the rotational speed of the rotor/flywheel. When the rotational speed of the rotor/flywheel drops below a predetermined value, the flywheel controller 122 reconnects or recouples the motor/generator 128 to the source of electrical power, while the motor/generator 128 is configured to function as a motor. In this way, the rotational speed of the rotor/flywheel of the flywheel/rotor assembly 126 can be increased and after again reaching the predetermined desired rotational speed or being with the desired range of rotational speeds, the electronics module 122 disconnects the motor/generator from the electrical power source. In this way, the flywheel controller 122 automatically maintains the power producing capacity of the FESS unit so as to be in a desired range when in the standby mode.

It should be noted that the foregoing is one of the auxiliary loads that would be associated with normal operation of the of the array 100a of FESS units 120. Such other loads including power for the flywheel controller 122, lubricating and cooling systems for the FESS units, and heating and cooling systems (HVAC systems for the housing 150 or structure containing the FESS units 120 as well as any other associated control and power conversion electronics obtain power from the electrical distribution grid in any of a number of ways known to those skilled in the art and as such are not specifically detailed further here in regards to FIG. 6.

When the FESS unit is to produce power, the flywheel controller 122 configures the motor/generator 128 so as to function as a generator. Because the motor/generator 128 is mechanically coupled to the flywheel or rotor of the flywheel/motor assembly 126, the motor/generator uses the rotational kinetic energy provided by the spinning rotor/flywheel to generate electrical energy. Typically, the flywheel controller 122 also would electrically couple the motor/generator 126 to the electrical load.

As described in U.S. Pat. No. 6,262,505, the flywheel controller 122 also is configurable so as to monitor a number of operational parameters and providing localized control over the operation of the FESS unit. In particular embodiments, the flywheel controller 122 monitors operational parameters to determine if the rotation of the flywheel/rotor of the flywheel/rotor assembly should be terminated or reduced, such as in the case of a detected over speed condition or where there are indications suggesting of possible rotational instability or potential failure of the flywheel/rotor assembly. If the flywheel controller 122 determines that action should be taken, the flywheel controller causes the FESS unit to shutdown (e.g., stop the rotor/flywheel from spinning) and typically outputs a signal indicating such shutdown.

In addition, and as described in U.S. Pat. No. 6,262,505, the flywheel controller 122 also is configured and includes mechanisms by which such operating parameters and/or operational status also are outputable to a remote monitoring location, such as a control room remote from the FESS unit 120, so as to allow operational condition or performance of the FESS unit to be remotely monitored and thus providing information relative to FESS unit availability and capability. In the present invention, such monitoring/reporting signals are sent from each FESS unit 120 of the FESSarray 100 to the array controller 130. The array controller 130 accumulates these signal and communicates such signals to the remotely located monitor 140. Alternatively, it is contemplated that such monitoring and reporting is accomplished by sending the monitoring/reporting signals from each FESS unit 120 of an FESS array to the remotely located monitor 140.

The array controller 130 includes a CPU 132, having a memory and storage 134. As described herein, the present invention also includes one or more applications programs for execution in the CPU 132. The array controller 130, more particularly the applications programs being executed, is configured and arranged so as to control communications between a dispatch location 150, and/or between the remotely located monitor 140 and the array controller 130 as well as between and among the FESS units 120 comprising the FESS array 100. The array controller 130, more particularly the applications programs being executed therein, also is configured and arranged so as to control the operation of the one or more FESS units 120 of the array so as to deliver electrical power to the power distribution system or to absorb electrical power form from the electrical distribution systems responsive to signals from the dispatch location 150 such as the regulation signals illustrated in FIG. 10.

The storage 134 for the array controller 130 is any of a number of volatile or non-volatile storage mechanisms or memories known to those skilled in the art that are appropriate for the intended use. Such non-volatile storage mediums include flash or spindle types of memory including for example NVRAM as well as hard drives. In addition, such storage 134 can comprise different forms of storage media such as flash and spindle types of memory. The storage 134 can be used for storing information and/or the one or more applications programs. In more particular embodiments, the storage 134 temporarily stores operating conditions/parameters for each of the FESS units 120 of the FESS array. In this way, the CPU 132 can perform a routine periodic batch transmission of such operating conditions/parameters to the remote monitor 140 as well as transmitting such information at other times when appropriate. The CPU 132 and the associated memory, include any of a number of devices known to those skilled in that art that are appropriate for the intended use and application.

The FESS array 100 also includes a switching mechanism 160 that couples and de-couples the FESS array from the electrical distribution system. The switching mechanism 160 is any of a number or switches or switching circuitry known to those skilled in the art appropriate for the intended use. Alternatively, the FESS array 100 is configured and arranged with a plurality of switching mechanism 160, where a switching mechanism is located in the line from each FESS unit 120 coupling the FESS unit to the electrical distribution network. In further embodiments, a switching mechanism 160 also is located in the common line to the electrical distribution network as illustrated in FIG. 6.

Although a single line between each of the FESS units 120 and the electrical distribution network is illustrated, this shall not be limiting as a plurality or more lines can be provided between the distribution network and FEES unit. For example, a power input line is provided to each FESS unit 120 for delivering electrical power to the FESS unit and an output line is provided to each FESS unit to deliver electrical power from the FESS unit to the electrical power distribution system.

Figure 7A:
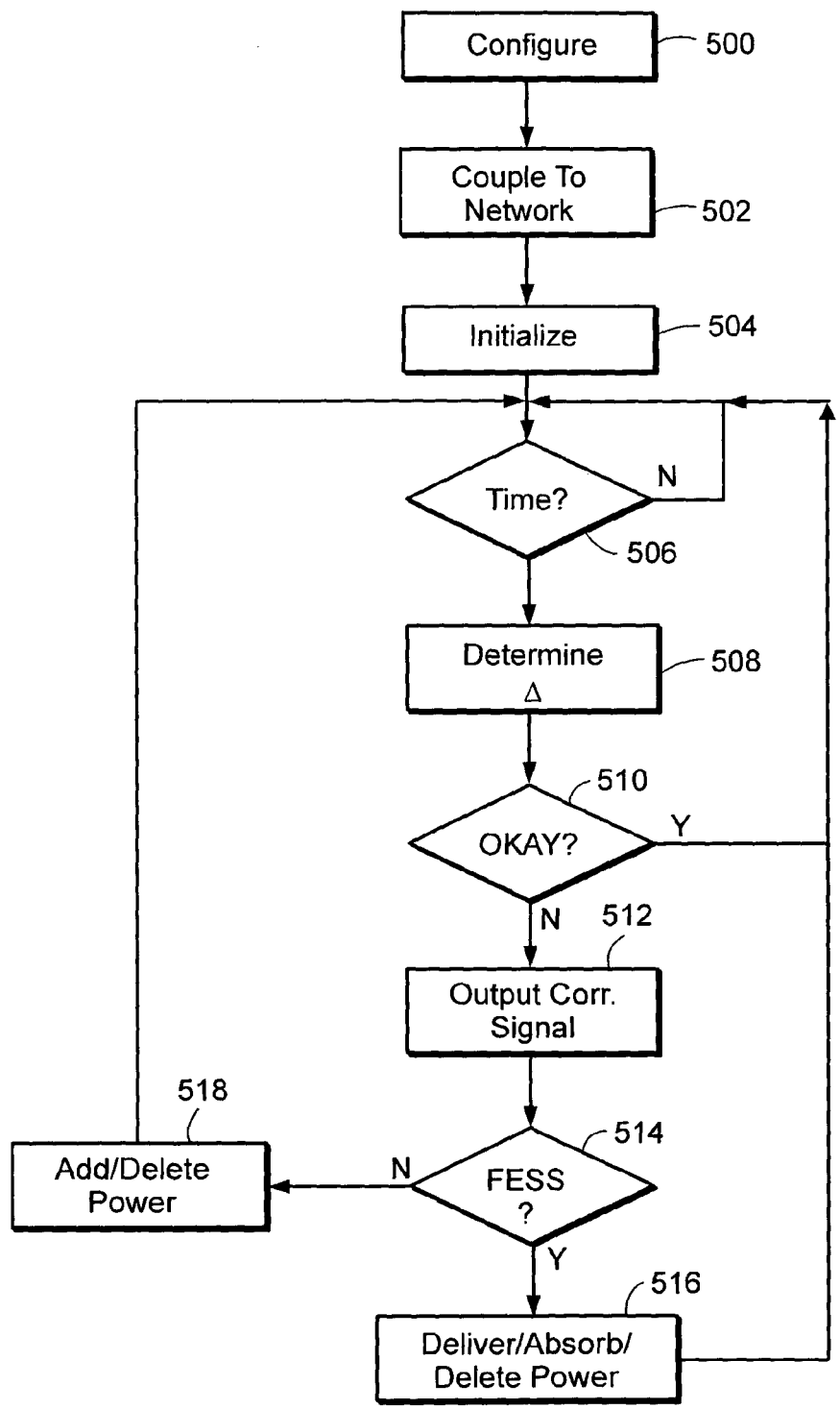
FIG. 7A is a high level flow diagram illustrating a methodology according to an aspect of the present invention.

The operation of an FESS array 100 or an FESS array sub-system 200 and the methodology embodied in the one or more applications programs for execution within the array controller 130 can be best understood from the following discussion with reference to the flow diagram illustrated in FIGS. 7A,B. In addition, reference also shall be made to FIGS. 4-6 and the related discussion for details regarding the functional components of the FESS array 100 or the FESS array sub-system 200 not otherwise provided in the following discussion.

Referring now to FIG. 7A, there is shown a high level flow diagram illustrating a methodology according to one aspect of the present invention for regulating frequency using one or more FESS arrays 100. Initially the user or power-generating supplier configures each of the one or more FESS arrays 100 to provide the desired power generating capacity, STEP 500.

As indicated herein, the FESS array 100 according to the present invention is composed of one or more FESS units 120, where each FESS unit is configured and arranged so as to have a predeterminable power generating capacity when the flywheel/rotor of the flywheel/rotor assembly 126 is being rotated in the predetermined range of rotational speeds. As such, an FESS array 100 of the present invention is thus scalable to provide different power generating capacities by appropriately configuring a given FESS array with the number of FESS units required to attain the desired power generating capacity. For example, to yield an FESS array 100 with a desired power generating capacity of 1-2.5 MW for 15-5 minutes, then one could configure the array so as to be composed of 10 FESS units 120 capable of producing 25 kWh (5 Kw). If additional capacity is required for example, lets say providing power generating capacity of 3-7.5 MW for 15-5 minutes, then one would scale up the FESS array 100 so as to include more FESS units 120.

Alternatively, a user or power-generating supplier would provide a plurality or more of FESS arrays 100 that are combined to form an FESS array sub-system 200. In such a case, each of the FESS arrays 100 would be configured with a power generating capacity that when combined in the aggregate would yield an FESS array sub-system 200 having the desired power generating capacity. For ease of use, a power-generating supplier can pre-configure an FESS array 100 so as to have a set power generating capacity for a given time period and to scale up to the required capacity by supplying a plurality or more of such FESS arrays 100. Such a configuration for an FESS array sub-system 200 also yields a configuration, whereby the addition, deletion or absorption of electrical power can be further controlled by controlling how many of the FESS arrays 100 of a given sub-system are electrically coupled to the electrical distribution network.

It should be recognized that such configuring also takes into account whether the one or more FESS arrays 100 are to be fixed sites or sites composed of FESS arrays that are transportable or mobile. In the case of transportable or mobile arrays, the scalability of an FESS array is subject to the limitations imposed by the means or mechanisms by which the FESS array is being transported. For example, a truck-distributed FESS array would be subject to width and length restrictions imposed on vehicles using the highways. Such configuring also would consider how many of the one or more FESS arrays 100 are to be distributed within an electrical power distribution network and the requirements or limitations imposed at the physical location where the each of the one or more FESS arrays are to be located.

Each of the one or more FESS arrays also is configured with the control circuitry necessary for controlling the operation of the one or more arrays so the one or more arrays are selectively coupled or decoupled from the power distribution network and when coupled to provide power (e.g., inject power) to, or absorb power from, the power distribution network. The foregoing are illustrative of a number of the considerations that a power-generating supplier would evaluate or consider when configuring an FESS array, however, the foregoing shall not be considered as limiting the present invention only to these considerations and/or situations.

After configuring the one or more FESS arrays 100 for use in an electrical distribution network, the power-generating supplier operably couples the one or more FESS arrays 100 and/or the one or more FESS array sub-systems 200 to the electrical distribution network, step 502 such that the FESS arrays/FESS sub-systems are electrically coupled to the power distribution network. As illustrated in FIG. 6, it is within the scope of the present invention, to position one or more switching mechanisms 160 so the FESS array 100 and/or the FESS units 120 of the array can be electrically coupled to the distribution network.

After operably coupling the one or more FESS arrays 100 and/or the one or more FESS array sub-systems 200 to the distribution network, the power-generating supplier electrically initializes each FESS array or each FESS array sub-system so as to be capable of providing electrical power to the power distribution network, STEP 504. Such initializing is accomplished by electrically coupling each FESS array 100 and/or each of the FESS units 120 of the FESS array to the power distribution network and putting each of the FESS units into its charging mode so as to draw power from the power distribution network, as herein described. In this way, the power drawn from the power distribution network is converted into kinetic energy and this kinetic energy is stored within the FEES unit 120 as herein described and as is known to those skilled in the art. It is contemplated, and within the scope of the present invention, for the FESS arrays to be controlled such that such initializing occurs at times when it is determined that there is excess generating capacity in the distribution network and that this excess energy can be absorbed by a given FESS array 100. In this way, excess power can be stored and re-distributed back to the distribution network at a later time.

After initializing the one or more FESS arrays 100 and/or FESS array sub-systems 200, the operation of the FESS arrays/FESS array sub-systems is controlled by the operational needs and circumstances of the electrical power distribution network. This is accomplished by first making a periodic determination each time after a predetermined time period has elapsed, STEPS 506, 508. According to one known techniques, the owner or agent of a power distribution network or the agent of the owners of a plurality or more of power distribution networks, basically makes a periodic comparison (e.g., once every two (2) or four (4) seconds) of the total power being generated and the electrical load on the network and determines what the difference is between the generated power and electrical consumption (i.e., lines losses for the transmission and distribution network and customer load(s)) at that time and also what this difference will be for some time in the near future.

Typically the "some time" in the future is established based on the time required for a given power/frequency regulation power generating facility to react (e.g., add or reduce power generating capacity). With existing or conventional power generating facilities, such reaction time periods vary based on the type of power generating facility, however, the present rule of thumb for those power generating facilities that are used for fine tune regulation (i.e., fine tune regulation of frequency) is a reaction time of about five (5) minutes. It should be recognized, that FESS units 120 advantageously are capable of being loaded and unloaded from the power distribution network with greater speed that such conventional power generating facilities without creating an operational detriment to the FESS units as compared for example, to the harm such cyclical loading/unloading can create for the batteries of a battery farm. As is known to those skilled in the art, the determination as to the future difference between the power generation and electrical power consumption also can take a number of other consideration into consideration to yield a correction error signal.

Figure 10:
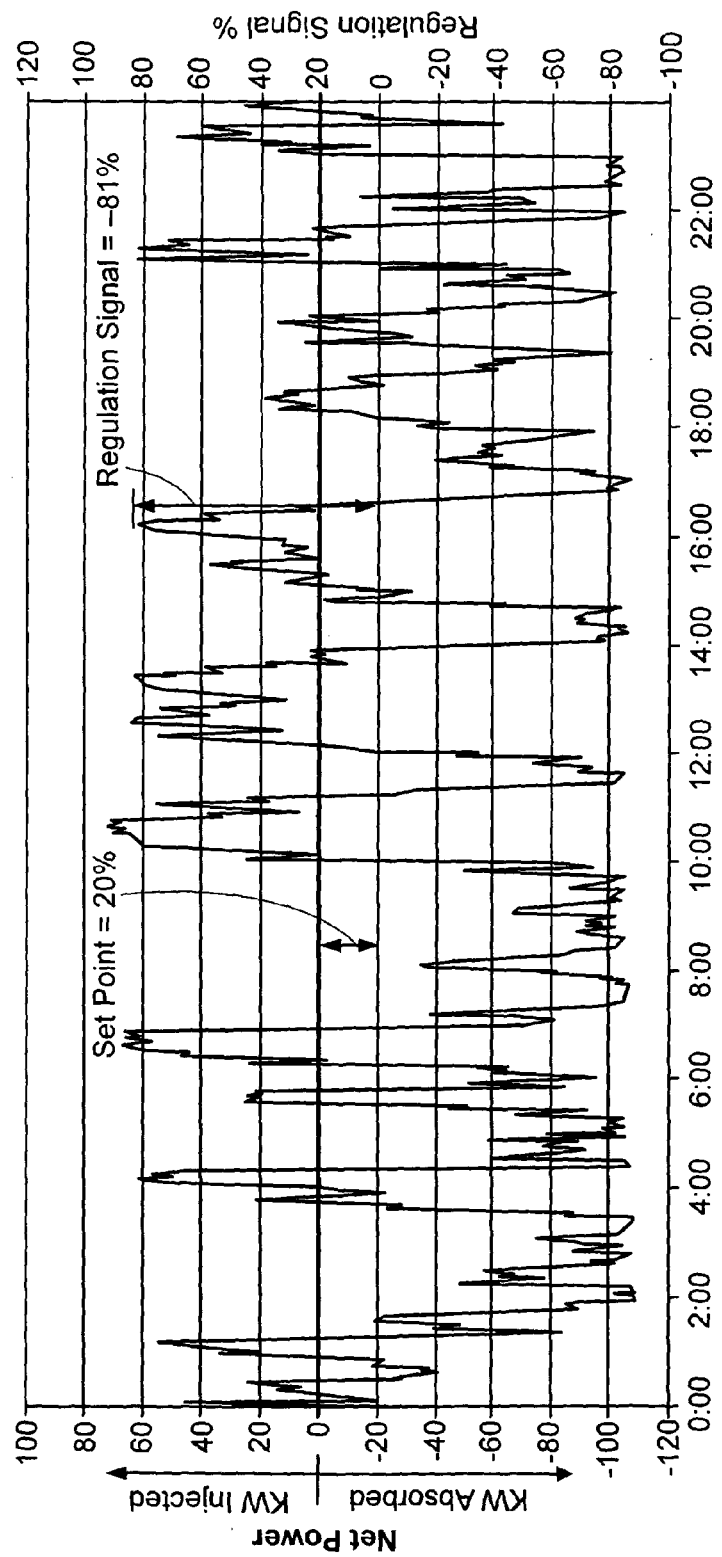
FIG. 10 is a graphical view illustrating a regulation signal and set point.

A further determination is made based on the correction signal being outputted as to what action should be taken to adjust the power being generated and being delivered to the power distribution network, Step 510. If it is determined that the power being generated matches the load (YES, Step 510), then the process returns to initiating or performing the above determination process after the next time period has elapsed. It is more likely, however, given the manner in which the power consumption (customer load plus network/line losses) can vary as a function of time, that such a determination determines that there is and will be a mismatch (NO, Step 510) because too little or too much power is being generated as compared to power consumption. Thus, the agent or dispatcher outputs correction signals to each of the power generating facilities used for power and frequency regulation, Step 512. There is shown in FIG. 10 a graphical view that illustrates a typical regulation signal output as a function of time that generally comprises the correction signal outputted by the dispatcher/agent.

For an electrical power distribution network that include one or more FESS arrays 100 and/or one or more FESS array sub-systems 200, the FESS arrays/FESS array sub-systems evaluate such correction signals to determine if it is a signal for modifying the operation of a given FESS array/FESS array sub-system, Step 514. In cases where the correction signal is not being outputted to a given FESS array/FESS array sub-system (NO, Step 514) then the process continues as with conventional techniques for regulation, whereby power generating capacity is added or deleted and/or the control signal is used to adjust (i.e., increase or decrease) the power generating capacity of a given power generating facility.

If it is determined that the power generating correction signal is for a given FESS array 100 or FESS array sub-system 200 (YES, Step 514), then the FESS array is controlled so as to alter the present operational status and condition of the FESS array or FESS array sub-system, Step 516. More particularly, the array/array sub-system 100/200 is controlled so as to adjust the power being delivered, so as to increase or decrease the amount being presently delivered; by altering the FESS unit operating mode from power delivery or power production to the charging mode so as to absorb excess power being generated; or by putting the FESS units in a standby mode so as to in effect remove or delete this power generating capacity from the power generation network.

It should be recognized that in addition to the timely responsiveness of an FESS array, in contrast to known and existing techniques and power generating facilities, an FESS array/FESS array sub-system 100/200 also can be advantageously configured to absorb electrical power. Thus, and in contrast to conventional techniques, the power being generated by other power generating facilities need not be automatically adjusted (e.g., decreased) or dropped to fine tune and match the total load of the system over the short time period of the mismatch as such fine tuning is accomplished by the FESS array/FESS array sub-system. Moreover, it is contemplated that the methodology, devices and systems of the present are adaptable so such absorbing of power is coordinated so that an FESS array 100 that has delivered power to the network is the array that is later selected for absorbing power from the network. In this way, the excess power is in effect stored in the FESS array for later delivery to the distribution network.

Figure 7B:
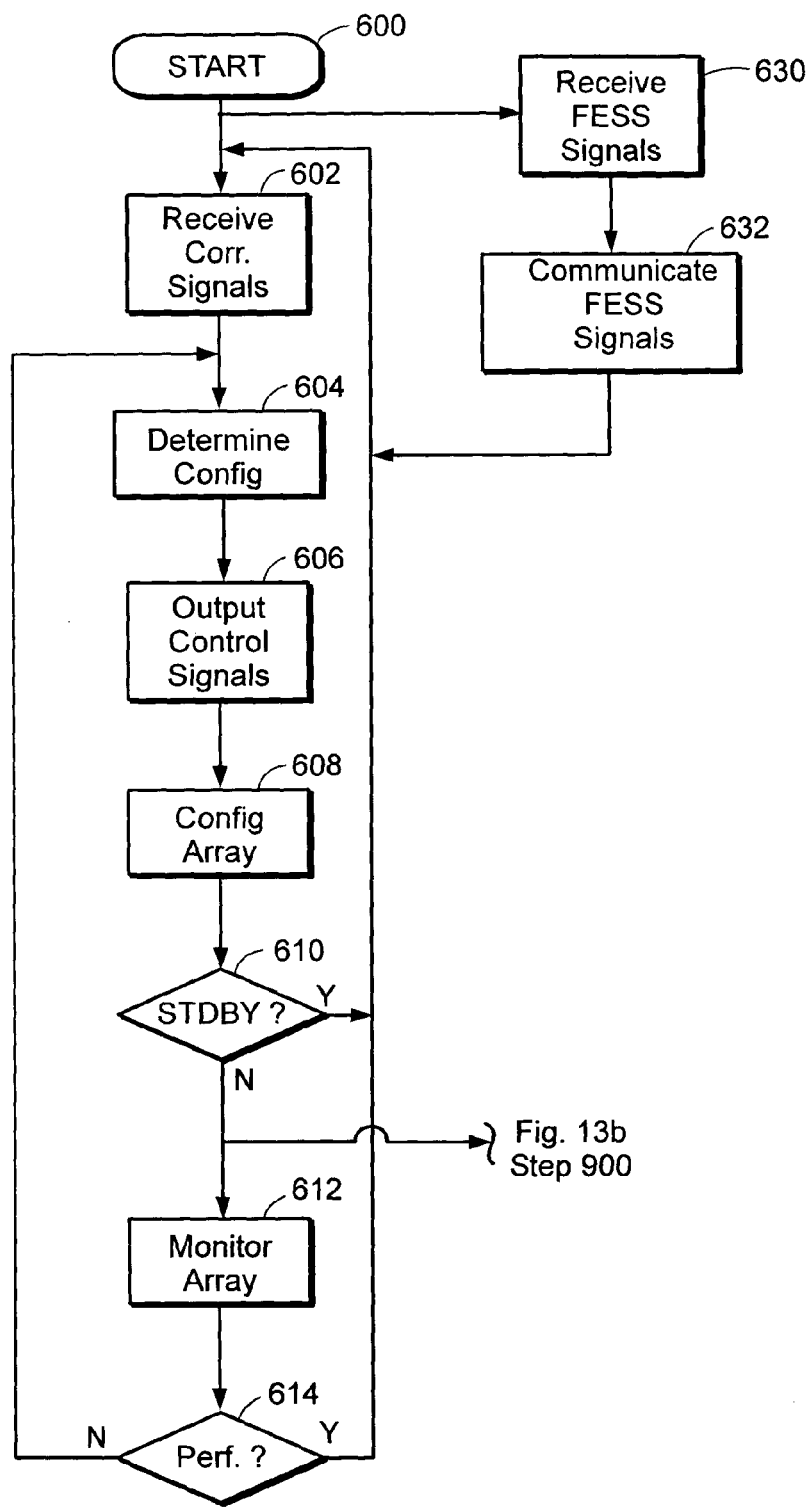
FIG. 7B is a flow diagram illustrating a methodology according to the present invention for controlling the FESS array.

Referring now also to FIG. 7B there is shown a flow diagram illustrating a methodology according to the present invention for controlling an FESS array 100, and more particularly the methodology embodied in the one or more applications programs for execution within the array controller 130. After the FESS 100 array has been configured, operably coupled to the power distribution network, and initialized (FIG. 7A, Steps 502-506), the process for controlling operation of the FESS array 100 and each of the FESS units 120 making up the FESS array is started, STEP 600. It should be recognized that it is contemplated in the present invention that the flywheel controller 122 of a given FESS unit 120 provides local control over the operation of the corresponding FESS unit as well as monitoring operational parameters and the like of the corresponding FESS unit. It also is within the scope of the present invention, for the FESS array controller 130 to also be configured and arranged so as to be capable of replicating and/or performing one or more of the control and/or monitoring functions of the flywheel controller 122.

After starting, the FESS array controller 130 monitors the communications link or network the FESS array is operably coupled to, for power correction signals from the remote dispatch 150 or control location, Step 602. When such control signals are received, the FESS array controller 130 then determines the operational configuration of the FESS array 100 and for each of the FESS units 120 thereof, Step 604. The array controller 130, responsive to such a determination, outputs the appropriate control signals to the FESS units 120 of the array so the array is in the determined operational configuration, Steps 606, 608.

Thus, if power is being delivered to the power distribution network for purposes of regulating the AC frequency of the power distribution network, the FESS array controller 130 outputs signals to each of the FESS units 120 of the array causing the flywheel controller 122 of each FESS unit to configure the motor/generator 126 as a generator. Alternatively, if power is to be absorbed then the FESS array controller 130 outputs signals to each of the FESS units 120 of the array causing the flywheel controller 122 of each FESS unit to configure the motor/generator 126 as a motor. Also, if the present absorption or delivery of power is to be terminated, the FESS array controller outputs signals to terminate such actions, for example, by having the flywheel controller 122 put the FESS unit 120 in the standby mode, or alternatively by locally de-coupling the FESS unit from the power distribution network. Although, it is expected that the FESS units 120 of the FESS array 100 will be operated in a unitary fashion, the present invention also contemplates having the FESS array controller 130 configured and arranged so it controls the FESS units individually such that one or more FESS units of a given FESS array can be operated differently than other FESS units of the array.

In the case where the FESS units 120 of the FESS array 100 are being put into the standby mode or status (YES, Step 610), then the process returns to monitoring the communications link for power correction/regulation signals. If the FESS array 100 is configured so as to deliver or absorb power then the FESS array controller 130 monitors the performance of the array to determine if the array configuration is operating as intended, Steps 612, 614. If it is determined that the FESS array configuration is not performing as intended (NO, Step 614), then the process returns to determining the configuration of the array 100 and repeats the foregoing. Essentially, the FESS array controller 130 re-evaluates the configuration of the array 100 to determine another configuration for the array. If it is determined that the FESS array configuration is performing as intended (YES, Step 614), then the process returns to monitoring the communications link for power correction/regulation signals (Step 602).

As indicated herein, the flywheel controller 122 of each FESS unit 120 typically monitors operational parameters and/or characteristics and provides output signals representative of monitored parameters/characteristics. In a further embodiment, the FESS array controller 130 is configured and arranged so as to monitor communication links with each of the FESS units 120 of the FESS array 100 for such monitoring/reporting signals from an FESS unit, Step 630. After receiving such signals, the FESS array controller 130 communicates the received signals to a remotely located monitoring site 140, Step 632. It also is contemplated that such signals to be outputted to an apparatus or device (e.g., laptop computer) that is electrically coupled to the array controller 130, for example via a RS-232 port or other communications interface as is known to those skilled in the art.

In particular embodiments, the array controller 130 is configured and arranged so as to receive and store such signals from all of the FESS units 120 of the FESS array 100 in the array controller storage 134. The FESS array controller 130 also is configured and arranged so as to communicate such stored information to the remotely located monitoring site 140 at one or more predetermined times, typically periodically. For example, communicating such information at particular times when the communications load on the communication links/networks is expected to be or typically is reduced. In more specific embodiments, the FESS array controller is configured and arranged so as to perform an evaluation of certain parameters or characteristics and in cases where the parameters or characteristics of a particular FESS unit 120 are outside an established value or exhibit a particular trend, the FESS array controller communicate the monitored parameters/characteristics to the remotely located monitoring site 140, with or without a flag or other indicator representative of a potential out-of norm condition.

Figure 8A:
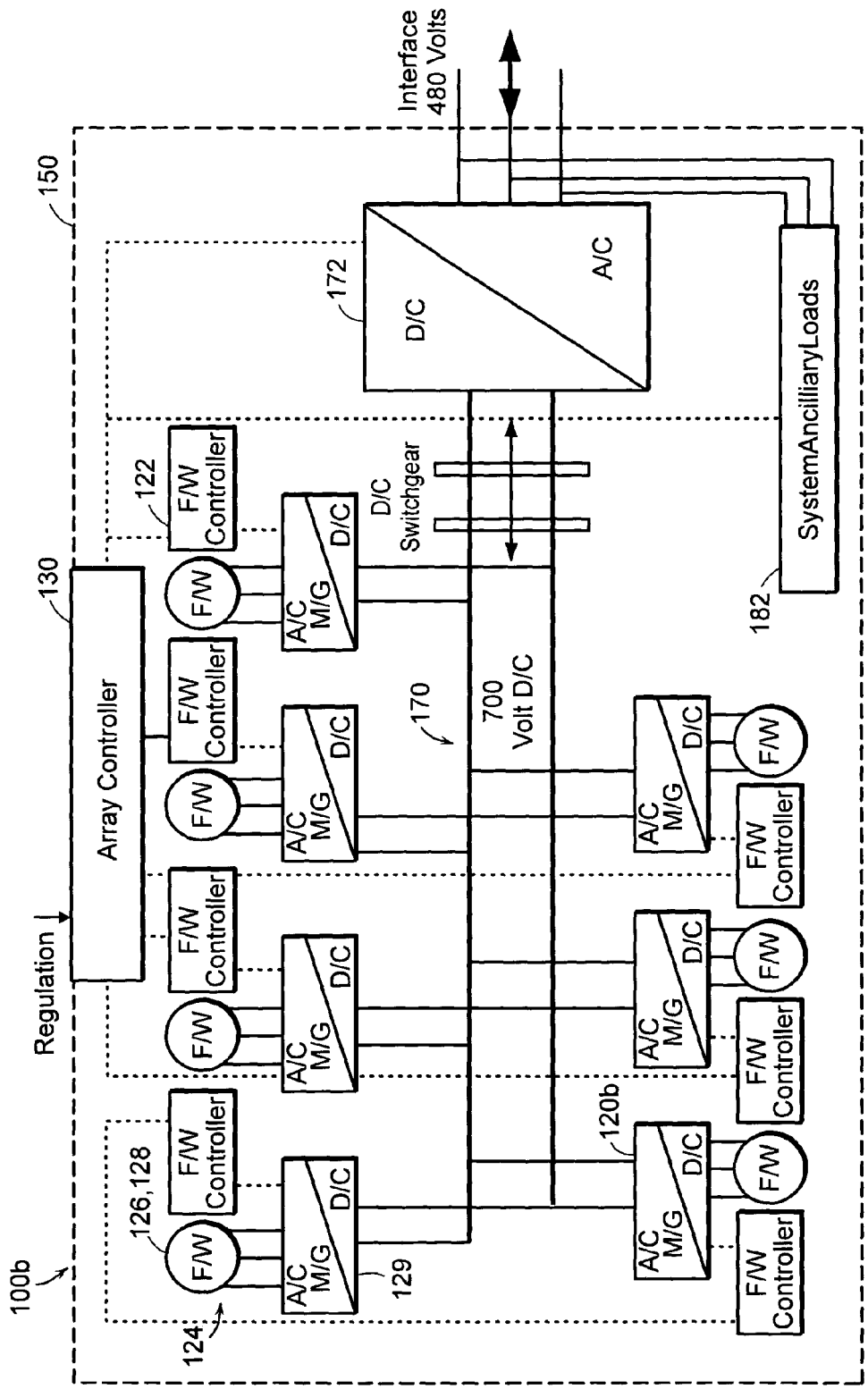
FIG. 8A is a schematic view of another embodiment of an FESS array according to the one aspect of the present invention.

Referring now to FIG. 8A, there is shown a schematic view of another embodiment of an FESS array 100b according to the present invention. Reference shall be made to the foregoing discussion for the FESS array 100a of FIG. 6 for the details and arrangements for any features or elements having common reference numerals. The FESS array 100b according to this embodiment differs from that shown in FIG. 6 in that the motor/generator 128b of this embodiment is configured and arranged so the FESS unit 120b provides a DC output (e.g., a 700 volt DC output). In the FESS array 100a of FIG. 6, each of individual FESS units 120 provides an AC output.

As such, each FESS unit 120 further includes a bi-directional inverter 129, as is known to those skilled in the art. The bi-directional inverter 129 of each FESS unit is operably and electrically coupled to a DC bus 170. The bi-directional inverter 129 is configured and arranged so as to convert AC outputs from the flywheel motor/generator 126, when it is being operated as a generator, to a DC output. When the flywheel motor/generator 126 is being operated as a motor to charge the FESS unit, the bi-directional inverter 129 converts the DC voltage and current on the DC bus 170 to an AC output.

The DC outputs from each of the FESS units 120 are inputted to the DC bus 70 (e.g., a common DC bus) that includes DC switchgear. The DC bus 170 is any of number of electrical circuits and materials as is known to those skilled in the art for conducting the DC current and voltage outputs to the power conditioning module 172. The power-conditioning module is any of a number of bi-directional inverters known to those in the art for converting a DC output from the array of flywheel energy storage systems to a desired AC output and for correspondingly converting an AC input to a DC output, when charging the FESS units 120. In an illustrative embodiment, the power-converting module 172 converts a 700-volt DC input to a 480-volt AC output, more specifically a 480-volt three phase AC output. In an illustrative exemplary embodiment, the power-conversion module 172 includes IGBT power electronics and is controlled by a DSP/FPGA-based, high-speed digital controller.

As indicated herein, there are a number of auxiliary components associated with each flywheel unit 120, the power conditioning module 172, the array controller 130 and other components associated with the housing 150 that receive electrical power from the electrical distribution grid. These auxiliary loads are illustrated schematically as the feature entitled system ancillary loads 182.

Figure 8B:
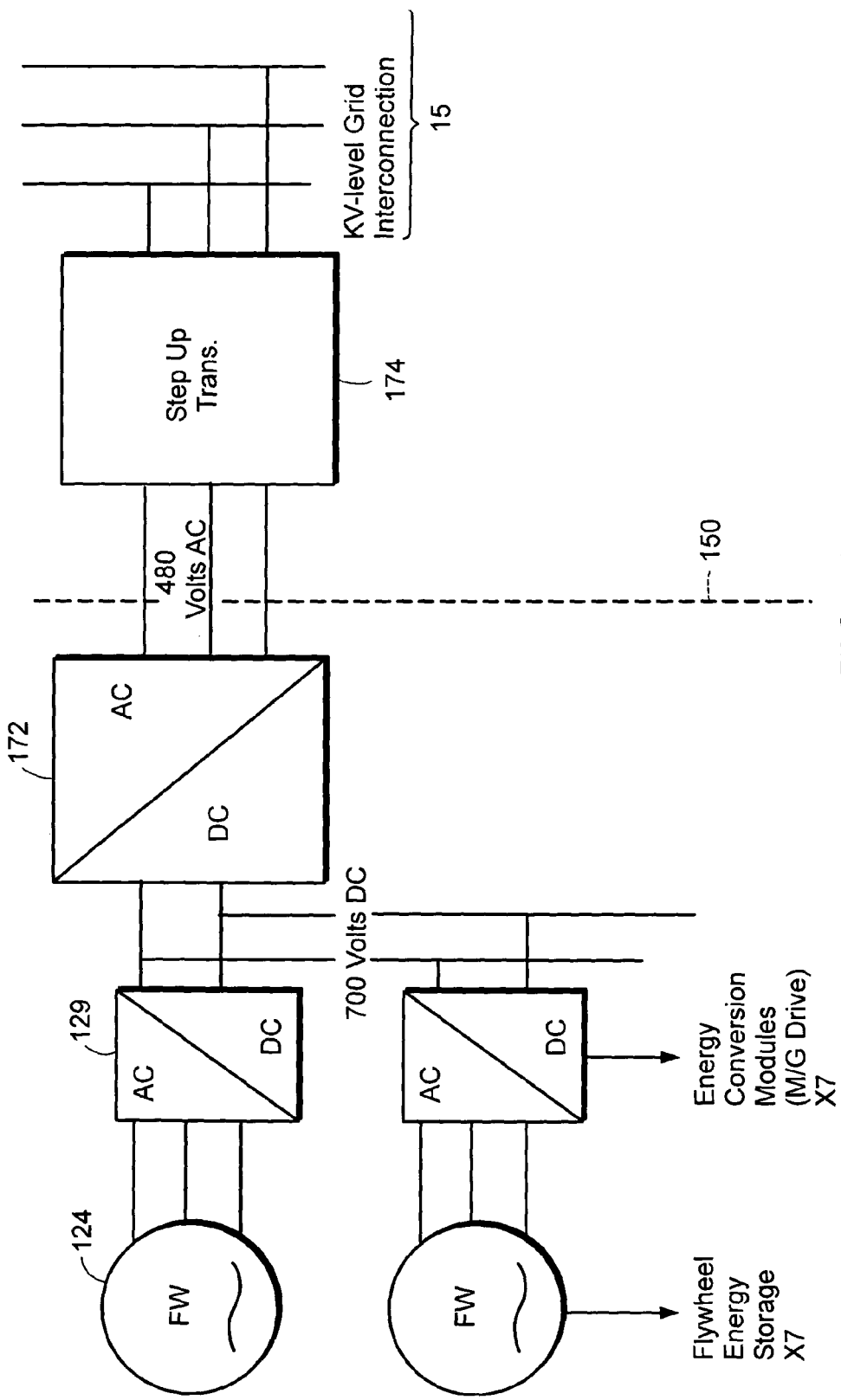
FIG. 8B is a schematic view that more particularly illustrates the connection of the FESS array of FIG. 8A to the electrical distribution grid.

Referring now also to FIG. 8B there is shown another schematic view that more particularly illustrates the electrical connection between the FESS array 100b and the grid interface 15 or grid interconnection with the electrical distribution grid. Since the voltage level of the electrical grid interface 15 is typically connected to an electrical distribution line that is operating a higher voltage level (e.g., 35, 69,115 KV) than the AC voltage output from the power conversion module 172, the FESS array 100b further includes a step-up transformer 174 that is operably, electrically coupled to the grid interface 15 and the power conditioning module 172. The step-up transformer 174 is any of a number of transformers known to those skilled in the art and that are appropriate for the intended use and operating conditions. Although this is being illustrated with reference to the FESS array of FIG. 8A, it is contemplated and within the scope of the present invention for such a step-up transformer to be used with the FESS array 100a shown in FIG. 6.

Figure 9A:
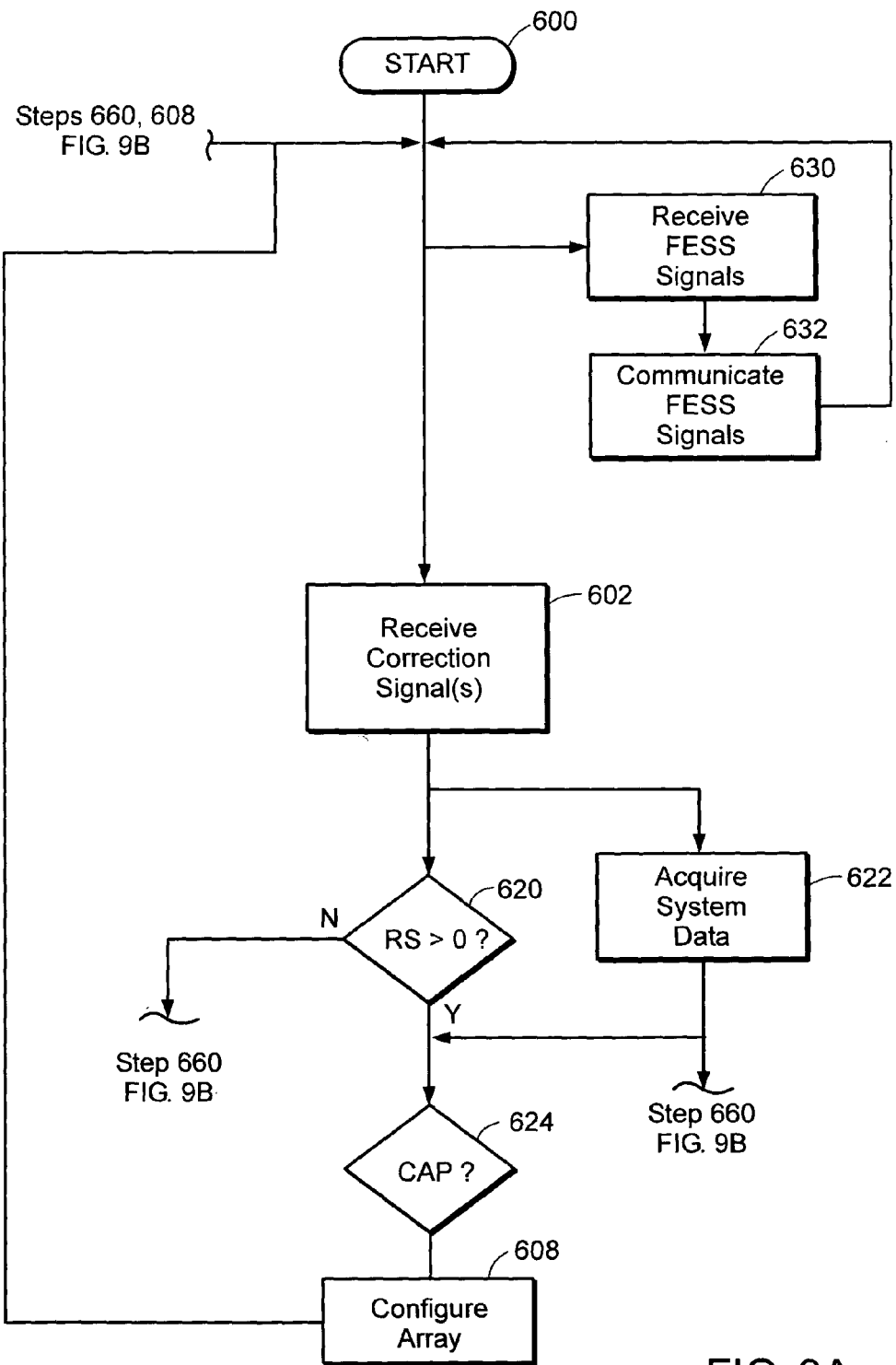
FIGS. 9A-B is a high level flow diagram illustrating another methodology according to the present invention for controlling the FESS array of FIGS. 8A,B.
Figure 9B:
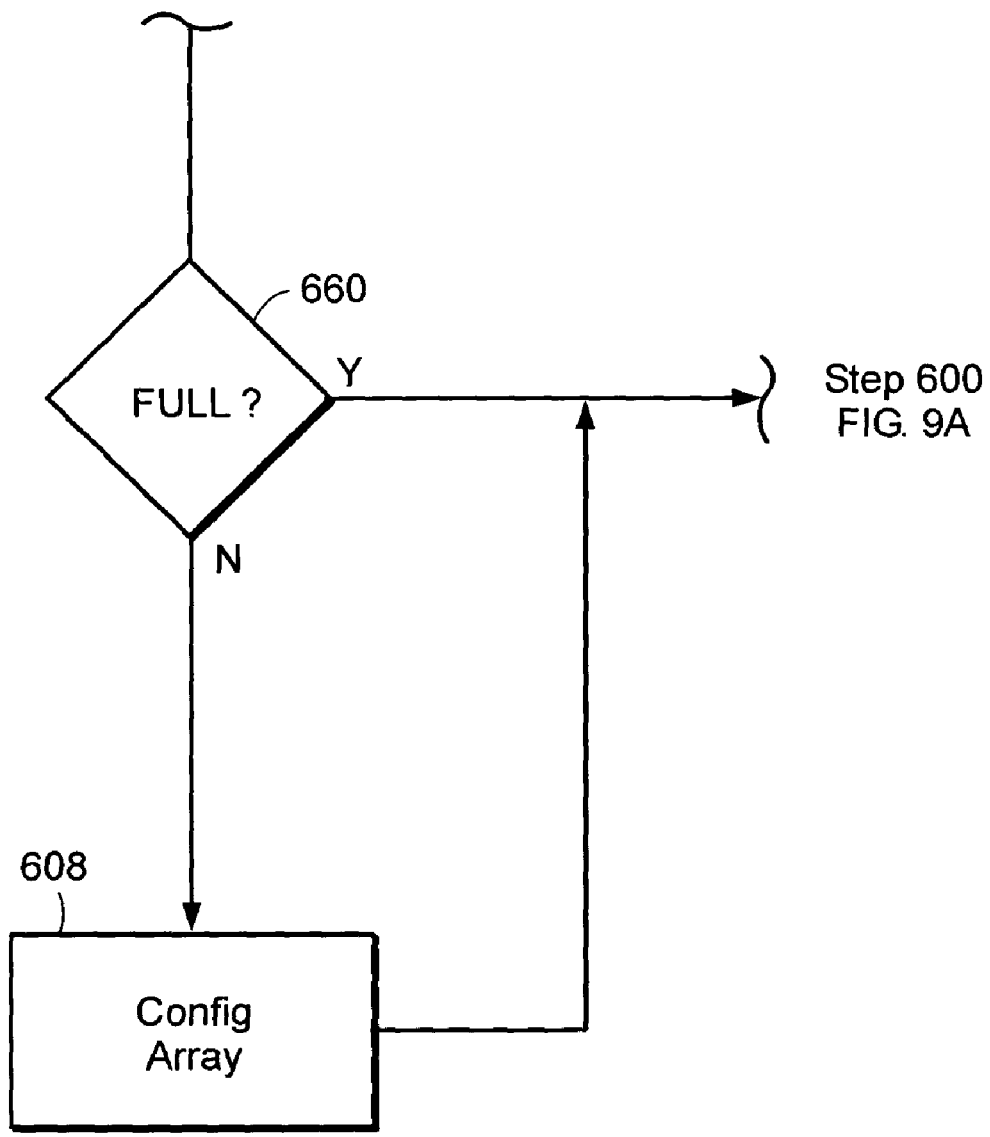

The operation of the FESS array 100b is understood when reference is taken to the foregoing discussion of FIG. 7A as well as to FIG. 8A, FIGS. 9A,B and the following discussion.

In this regard, reference shall be made to the foregoing discussion for FIGS. 8A,B and FIG. 6 for details and features of the array not otherwise include in the following. Reference shall be made to the foregoing discussion of FIG. 7A, that generally describes the process of locating an FESS array, configuring the array for use and the general process associated with absorbing power, providing power, and the stand by mode. The discussion which follows regarding FIGS. 9A,B relates to the specific process ort methodology being implemented in the array controller 130 to control the operation of the FESS array in general and the FESS units in particular. Reference shall be made to the discussion for FIG. 7B for those method steps shown in FIGS. 9A,B having the same reference numerals unless otherwise discussed below.

The array controller 130 continually monitors for correction signals, Step 602 such as the regulation signals shown in FIG. 10. In general, the regulation signal is representative of the amount of regulation that is requested to be provided over the next time step. The value being provided is between (−) 100% and (+) 100% of the maximum amount of power that can be provided/injected by the FESS array 100b or the maximum amount of power that can be absorbed by the FESS array. The minus sign represent signals where power is to be absorbed from the grid and positive signals represent signals where power is to be delivered to the grid. It should be understood that in respect to the present invention the maximum amount is similar to a rated capacity of the FESS to deliver or absorb power and is not necessarily an indication of what the FESS array 100b is actually capable of doing when it receives the regulation signal.

In more particular embodiments, the amount of power being injected or absorbed is typically measured downstream of the power conditioning module 172 and upstream of the step-up transformer 174. As indicated herein, the regulation signal is periodically updated by the system operator or agent and in more illustrative embodiments; the regulation signal is updated about every 2-4 seconds. As also shown in FIG. 10, when the FESS array is operated so as to have a non-zero base point or set point, the regulation signal refers to the amount of power being delivered/injected or absorbed with respect to the base or set point.

In the case of a set point, the set point as shown in FIG. 10 corresponds to the nominal power level of power being removed from the grid by the FESS array. The set point typically is a percentage of the full regulation signal or value. The set point is generally established with the power supplier/producer so as to be a constant value over an agreed period of time, such as for example one to 24 hours.

Once a correction or regulation signal is received, a determination is made to see of the value of if the RS-regulation signal (hereinafter RS) is greater than zero, Step 620. Alternatively, the process could be set so that a determination is made to see if RS less than zero. Along with evaluating the relative value of the regulation signal, the array controller also acquire system information, STEP 622, that provides an indication of the status and capabilities of the FESS array. For example, information is obtained that provides an indication as to whether the FESS array can absorb or provide power and the amount of power that can be absorbed or delivered.

If it is determined that RS is greater than zero (YES, step 620), then the regulation signal is requesting that the FESS array 100b provide or inject power of a specified amount to the grid. As such, the array controller 130 determines from the acquired system data if the FESS array 100b has sufficient capacity to deliver power to the grid, STEP 624. If it is determined that the FESS array has sufficient capacity (YES, step 624) then the array controller 130 causes the FESS units 120 and FESS array to be configured so as to output power to the grid. In further embodiments, the array controller 130 is configured so as to include a minimum level that is used to determine if the actual capacity of the FESS array is sufficient. After configuring the array so that power can be outputted the process returns to monitoring for signals/messages to the FESS array.

If it is determined that the FESS array does not have sufficient capacity (NO, step 624) then the array controller 130 takes no further action and the process returns to monitoring for signals/messages to the FESS array. The minimum level is generally established so that the kinetic energy being stored in the flywheel is not below a predetermined value before outputting power or that the kinetic energy does not fall below the predetermined value following delivery of power.

If it is determined that RS is less than zero (NO, step 620), then the regulation signal is requesting that the FESS array 100b absorb generated power of a specified amount from the grid. As such, the array controller 130 determines from the acquired system data if the FESS array is fully charged, step 660 or alternatively a determination is made to determine if the FESS array has sufficient capacity to absorb power from the grid. If it is determined that the FESS array is fully charged (YES, step 660) indicating that the array cannot absorb energy, then the process returns to monitoring for signals/messages to the FESS array (Step 60, FIG. 9A. If it is determined that the FESS array is not fully charged (NO, step 660) then the array controller 130 causes the FESS units 120 and FESS array to be configured so as absorb power from the grid. In the present embodiment, the FESS units 120 are arranged so as to reveive electrical energy from the grid and so as to increase the kinetic energy being stored in each FESS unit. After configuring the array so that power can be absorbed the process returns to monitoring for signals/messages to the FESS array, step 600, FIG. 9A.

Figure 11:
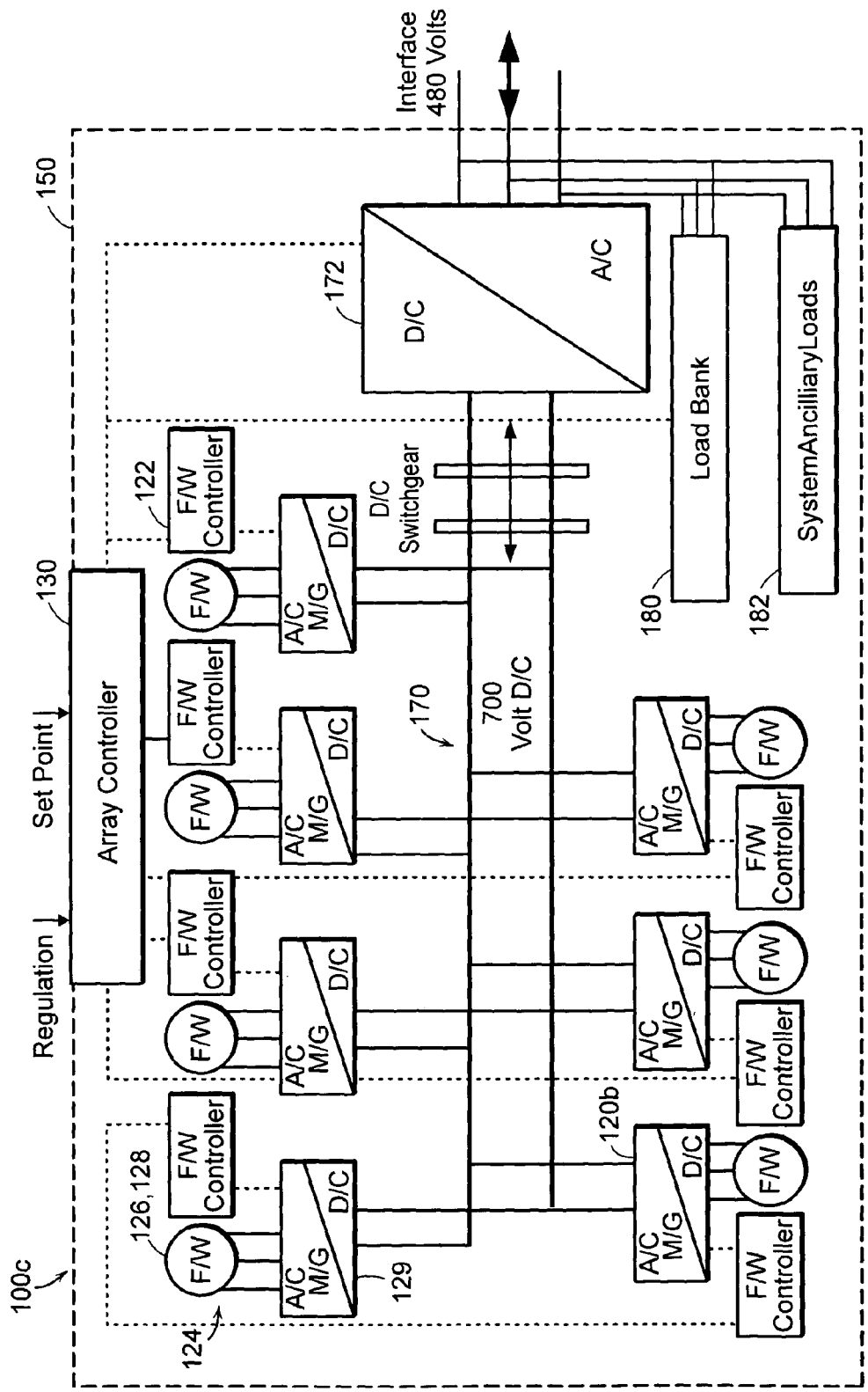
FIG. 11 is a schematic view of an FESS array according to other aspects of the present invention.

Referring now to FIG. 11, there is shown a schematic view of an FESS array 100c according to other aspects of the present invention. Reference shall be made to the foregoing discussion for the FESS arrays 100a,b of FIGS. 6 and 8A,B for the details and arrangements for any features or elements having common reference numerals. The FESS array 100c according to this embodiment differs from the array shown in FIG. 8A, in that FESS array 100c is configured and arranged so as to include an adjustable load 180.

The adjustable load 180 comprises a sink such as a load bank or a soft load that can be relatively easily unloaded and re-loaded from the FESS array 100c. For example, the sink or soft load could be a resistive heating element that is separately coupled to the grid interface 15. Thus, the absorbed electrical energy is separately and controllably delivered to the resistive heating element so as to provide useable heat energy or heat energy that is dumped to a heat sink (e.g., atmosphere). In another example, the soft load is another device, apparatus or system such as a pump or chiller unit or desalinizer where the other device, apparatus or system can use the excess energy as useable electrically energy (e.g., make ice or salt, purify water, pump a fluid, etc.). The adjustable load can be established so as to be capable of absorbing electrical energy equal to that capable of being absorbed by the flywheel energy storage systems or the pre-established maximum absorption capability for the energy storage sub-system (i.e., 100% regulation signal value). In more particular embodiments, the adjustable load is set so as to absorb an amount of energy equal to about 50% the pre-established maximum absorption capability for the energy storage sub-system, more specifically about 40%, 30%, 20% Or 10%.

Figure 12A:
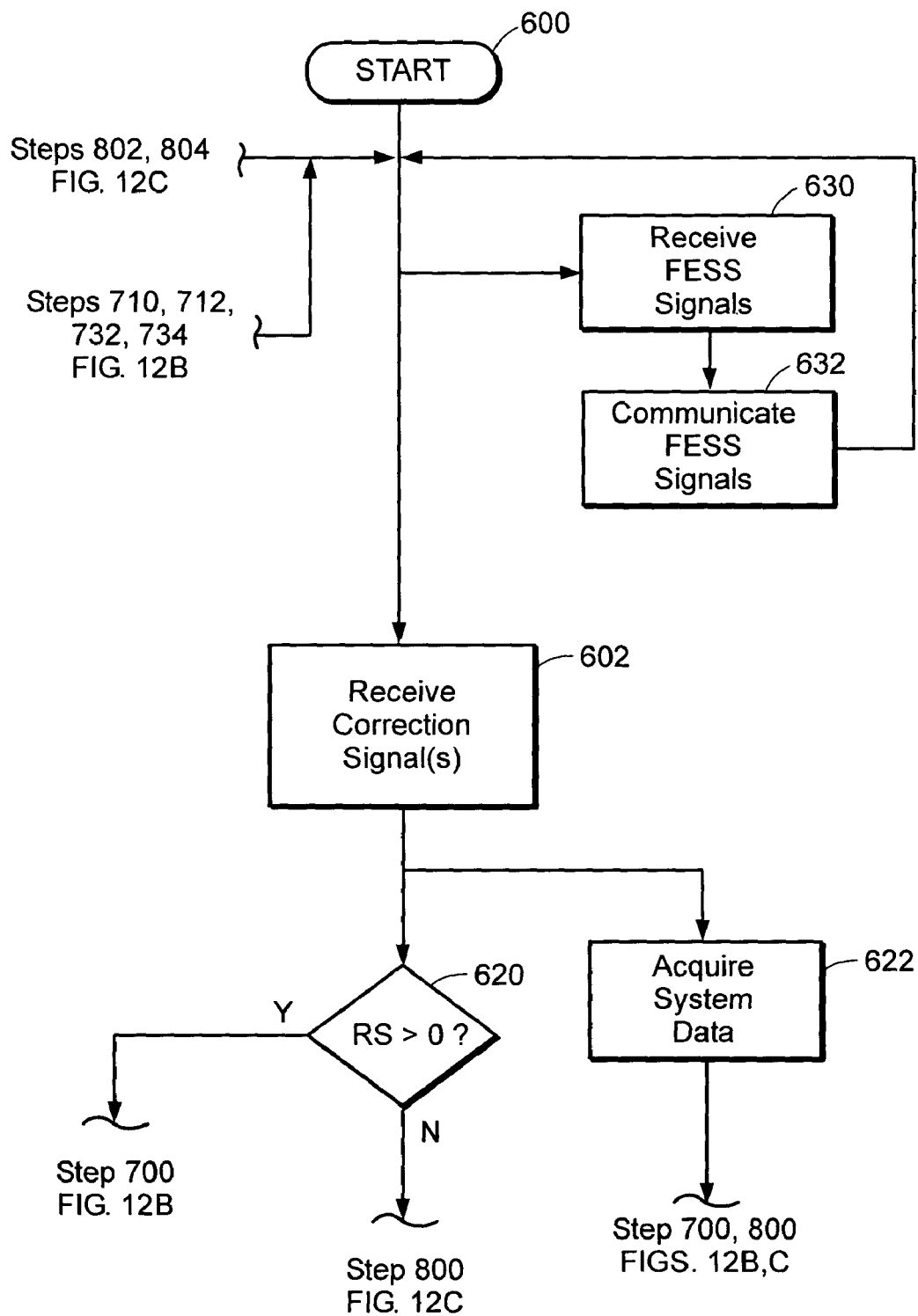
FIGS. 12A-C is a high level flow diagram illustrating another methodology of the present invention for controlling the FESS array of FIG. 10.
Figure 12B:
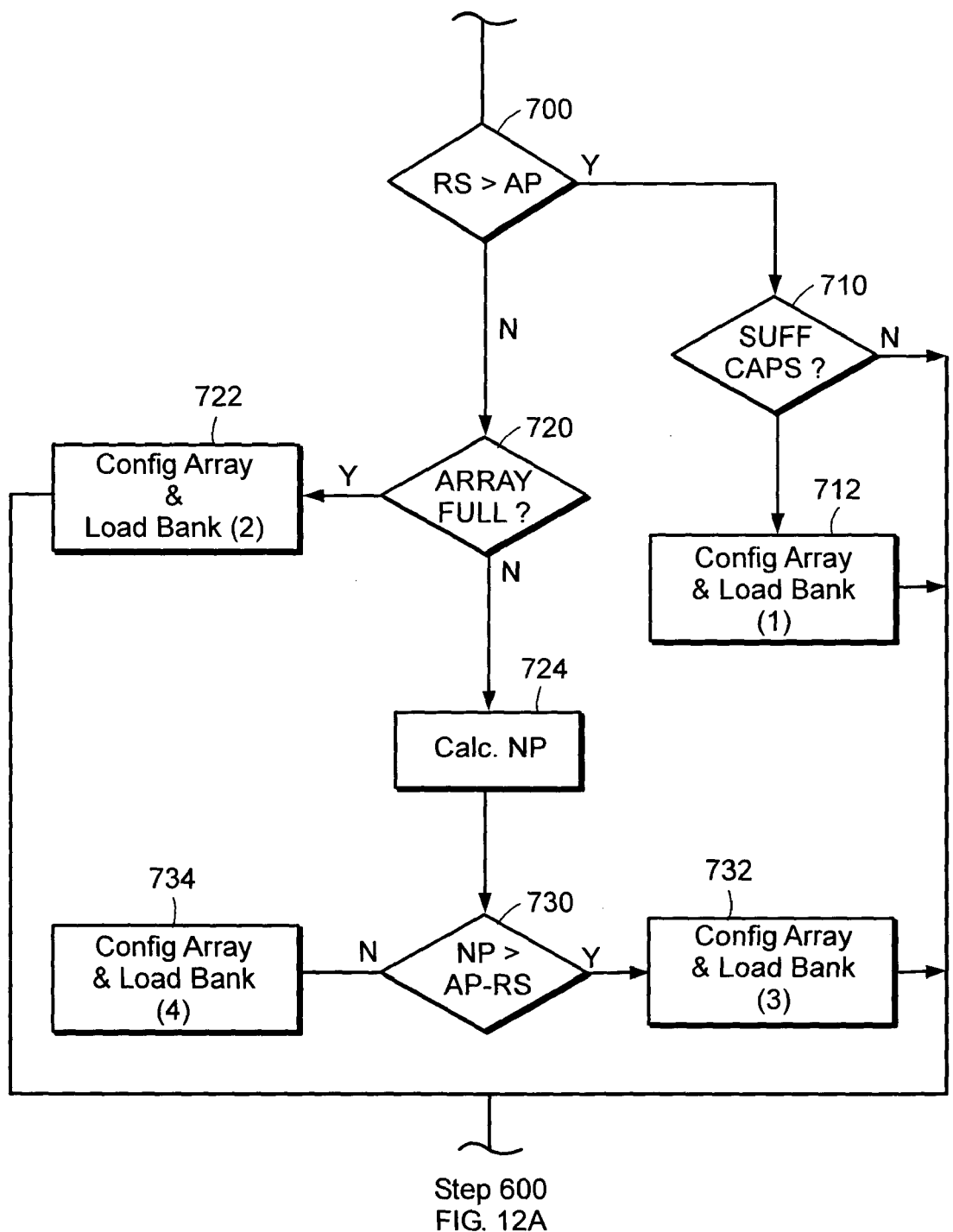
Figure 12C:
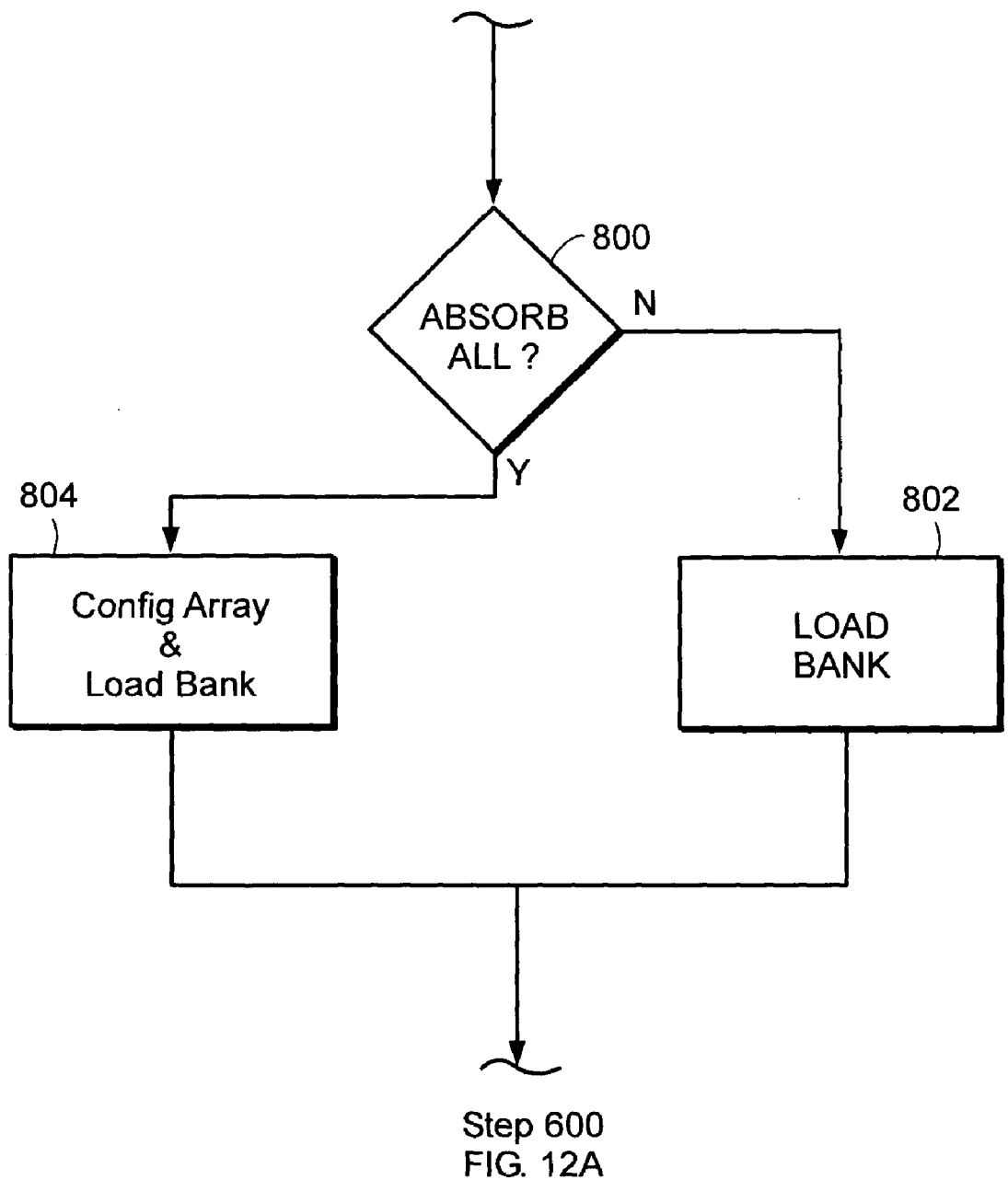

The operation of the FESS array 100c of FIG. 11 is understood when reference is taken to the foregoing discussion of FIGS. 7A, 8A, 9A,B and FIG. 11 as well as to FIGS. 12A-C and the following discussion. In this regard, reference shall be made to the foregoing discussion for the circuitry of FIGS. 6, 8A,B and FIG. 11 for details and features of the array not otherwise included below. Reference also shall be made to the foregoing discussion of FIG. 7A, that generally describes the process of locating an FESS array, configuring the array for use and the general process associated with absorbing power, providing power, and the stand by mode as well as the discussion of the controller controlling methodology of FIGS. 9A,b. The discussion which follows regarding FIGS. 12A-C relates to the specific process ort methodology being implemented in the array controller 130 to control the operation of the FESS array in general and the FESS units in particular. Reference shall be made to the discussion for FIGS. 7B and 9A,b for those method steps shown in FIGS. 12A-C having the same reference numerals unless otherwise discussed below.

The array controller 130 continually monitors for correction signals, Step 602 sucn as the regulation signals shown in FIG. 10. In general, the regulation signal is representative of the amount of regulation that is being requested to be provided by the FESS array 100c over the next time step. The value being provided is between (−) 100% and (+) 100% of the maximum amount of power that can be provided/injected by the FESS array 100b or the maximum amount of power that can be absorbed by the FESS array, where the minus sign represent power absorption and positive signals represent power to be delivered to the grid.

As also indicated herein and with reference to FIG. 10, when the FESS array is operated so as to have a non-zero base point or set point, the regulation signal refers to the amount of power being delivered/injected or absorbed with respect to the base or set point. In more particular embodiments, the set point is one or more parameters that is stored within the FESS array (e.g., in the array controller storage 134). The parameter(s) can be stored when the FESS array 100c is initially configured or can be updated at a later time either locally or from a remote location. Alternatively, the set point can be a parameter that is sent by the system operator or agent who also sends out the regulation signals.

Once a correction or regulation signal is received, a determination is made to see of the value if RS is greater than zero, Step 620. Alternatively, the process could be set so that a determination is made to see if RS less than zero. Along with evaluating the relative value of the regulation signal, the array controller 130 also acquires system information, STEP 622 that provides an indication of the status and capabilities of the FESS array.

If it is determined that RS is greater than zero (YES, step 620), then an evaluation is made to determine if RS is larger than the auxiliary power level (AP), step 700 (FIG. 12B). If RS is greater than AP than the array controller 130 determines from the acquired system data if the FESS array 100b has sufficient capacity at RS-AP to deliver power to the grid, Step 710. If it is determined that the FESS array has sufficient capacity (YES, step 710) then the array controller 130 causes the FESS units 120 and FESS array 100c to be configured so as to output power to the grid. In more particular embodiments, the FESS array 100c is configured so that the FESS units output a power output equal to about RS-AP. If the power equal to the set point (SP) being received by the FESS array is distributed to the adjustable load 180, then all or part of the power to the adjustable load also is diverted from the adjustable load back to the distribution grid.

If the FESS units do not have sufficient energy (NO, step 710) and the power equal to SP being received by the FESS array is distributed to the adjustable load 180, then the array controller 130 configures the FESS array 100c so that the power to the adjustable load is diverted from the adjustable load back to the distribution grid, Step 711. The array controller 130 does not change operational status of the FESS units 120. After such configuring of the arrays, steps 711, 712, so that power can be delivered the process returns to monitoring for signals/messages to the FESS array, step 600, FIG. 12A.

If on the other hand RS is determined to be less than SP than the array controller 130 determines from the acquired system data if the FESS array 100b is fully charged, step 720. If it is determined that the FESS array is fully charged with kinetic energy (YES, step 720) then the array controller 130 causes the FESS array 100c to be configured so as to output power to the grid, Step 722. In more particular embodiments, the FESS array 100c is configured so that the FESS units do not provide a power output and so the adjustable load is configured such that power equal to about actual power AP-RS is diverted from the adjustable load back to the distribution grid.

If it is determined that the FESS array is not fully charged with kinetic energy (NO, step 720) then the array controller 130 calculates NP, which is the amount of power needed to charge the flywheel to full in the allocated time step, step 724. Thereafter the array controller 130 determines if NP is greater than AP-RS, step 730.

If it is determined that the NP is greater than AP-RS (YES, step 730) then the array controller 130 causes the FESS array 100c to be configured so as to output power to the grid, Step 732. In more particular embodiments, the FESS array 100c is configured so that the FESS units absorb power from the grid at a power level equal to about AP-RS and so the adjustable load 180 is configured so that the power is diverted from the adjustable load to charge the FESS units 120. Since the amount of power being taken off the grid is now the auxiliary power level less the regulation signal, this power is available for charging of the FESS units 120.

If it is determined that the NP is not greater than AP-RS (NO, step 730) then the array controller 130 causes the FESS array 100c to be configured so as to output power to the grid, Step 734. In more particular embodiments, the FESS array 100c is configured so that the FESS units absorb power from the grid at a power level equal to about NP and so the adjustable load 180 is configured so part of the power is diverted from the adjustable load to charge the FESS units 120 and so an ouput of about AP-RS-SP is outputted to the grid. After so configuring the array (steps 732,734) the process returns to monitoring for signals/messages to the FESS array, step 600, FIG. 12A.

If it is determined that RS is not greater than zero (NO, step 620), then an evaluation is made by the array controller 130 which determines from the acquired system data if the FESS array 100c has sufficient capacity at to absorb the excess power=abs(RS), Step 800. If it is determined that the FESS array has sufficient capacity to absorb the power (YES, step 800 then the array controller 130 causes the FESS units 120 and FESS array 100c to be configured so the FESS units 120 absorb energy and the adjustable load is set to absorb a load equal to AP, Step 804. If it is determined that the FESS array does not have sufficient capacity to absorb the power (NO, step 800) then the array controller 130 causes the FESS array 100c to be configured so the FESS units do not absorb energy and so the adjustable load 180 is set to absorb a load equal to AP+abs(RS), Step 802. After so configuring the array (steps 802,804) the process returns to monitoring for signals/messages to the FESS array, step 600, FIG. 12A.

According to another aspect of the present invention, each of the FESS arrays 100 are configured and arranged in any one of a number of fashions to control the output voltage of each of the FESS units 120 making up the array so as to assure power production from all the power producing FESS units of the array. There are shown in FIGS. 13A-D various techniques and/or circuitry for controlling the output voltage of each FEES unit.

Figure 1A:
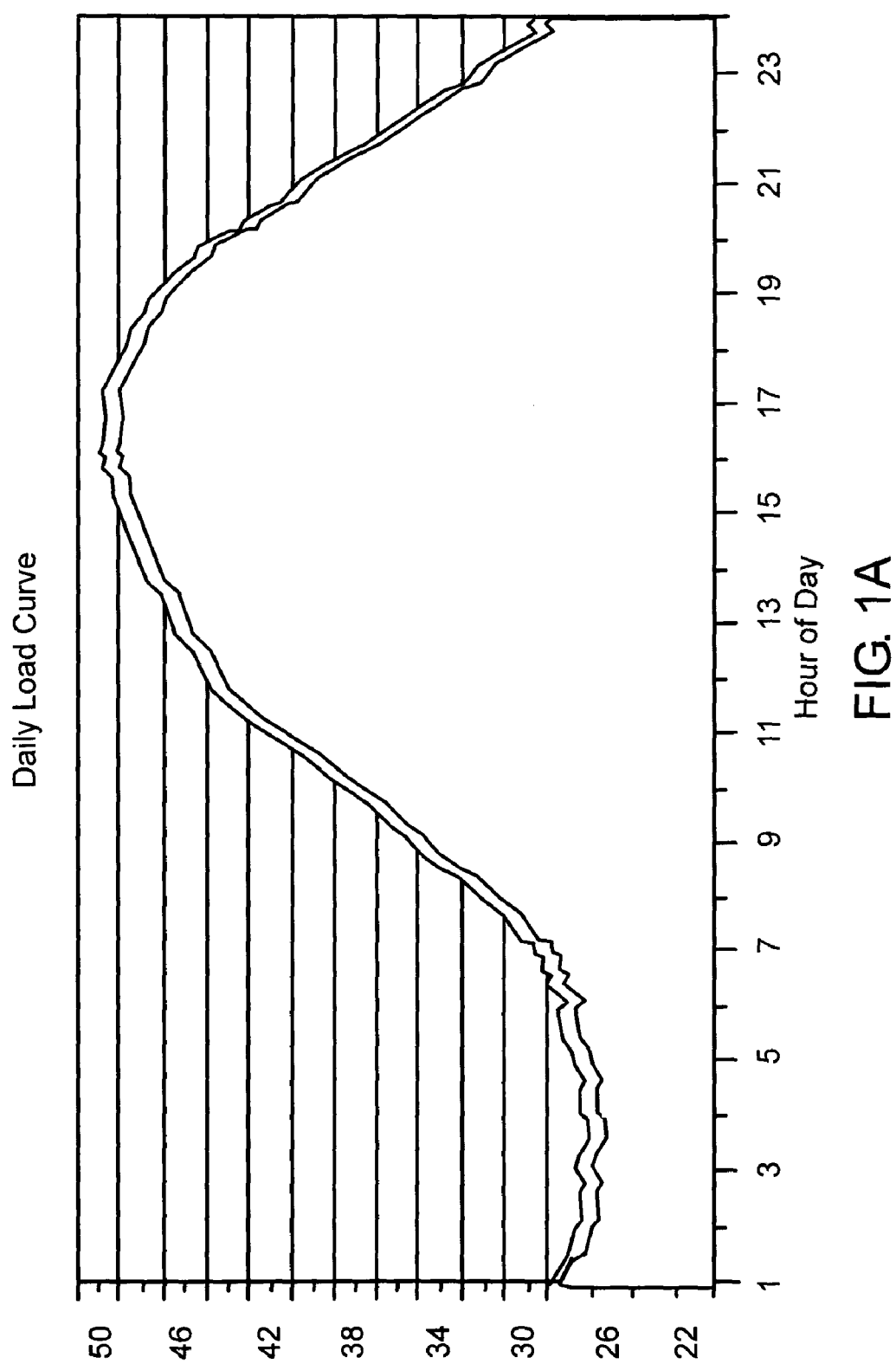
FIG. 1A is an exemplary daily load curve illustrating variation as a function of time of the electrical load.
Figure 1B:
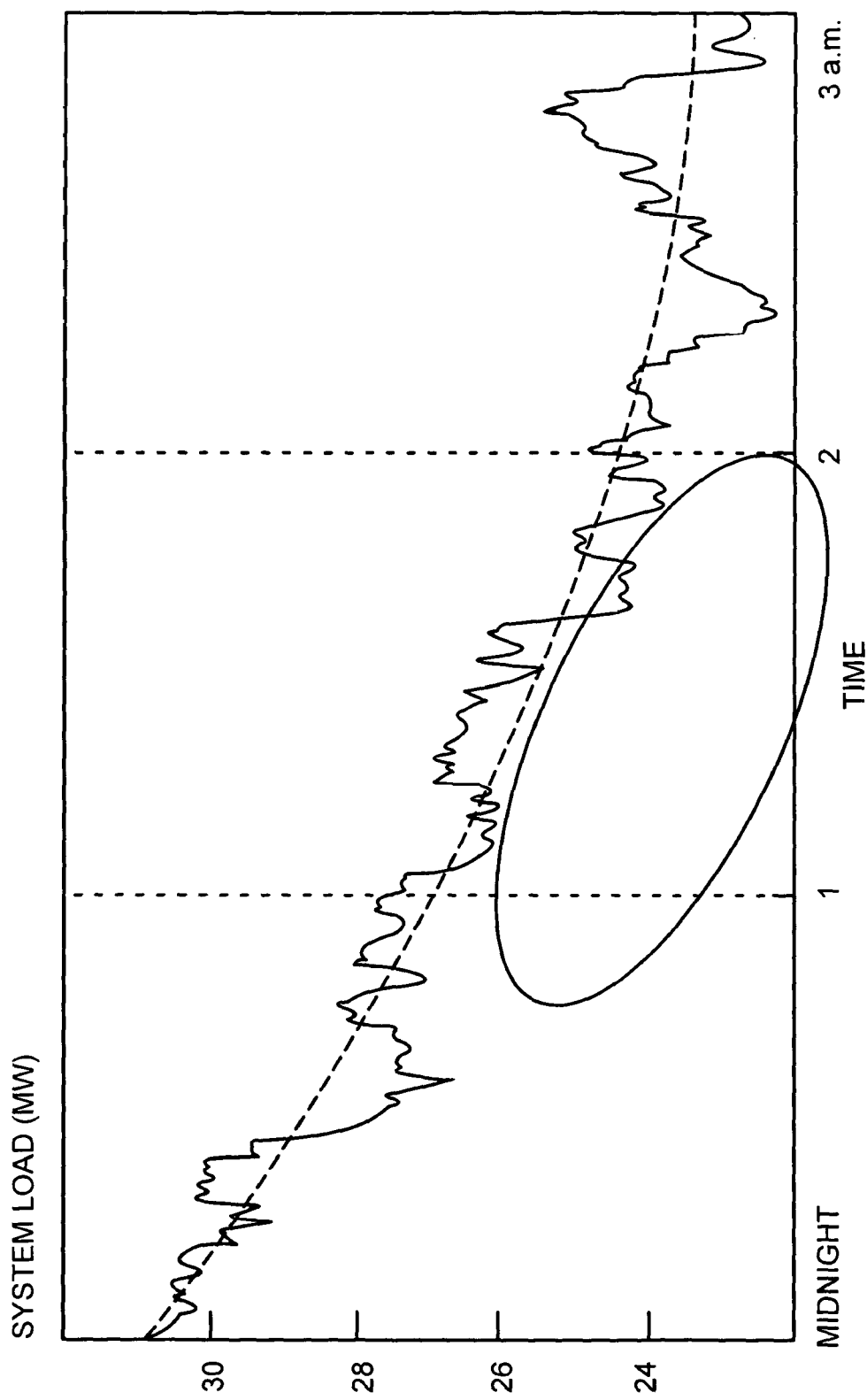
FIG. 1B is an exemplary load curve illustrating short-term variation in the daily load illustrated in FIG. 1A between the hours of midnight and 3 AM.
Figure 2:
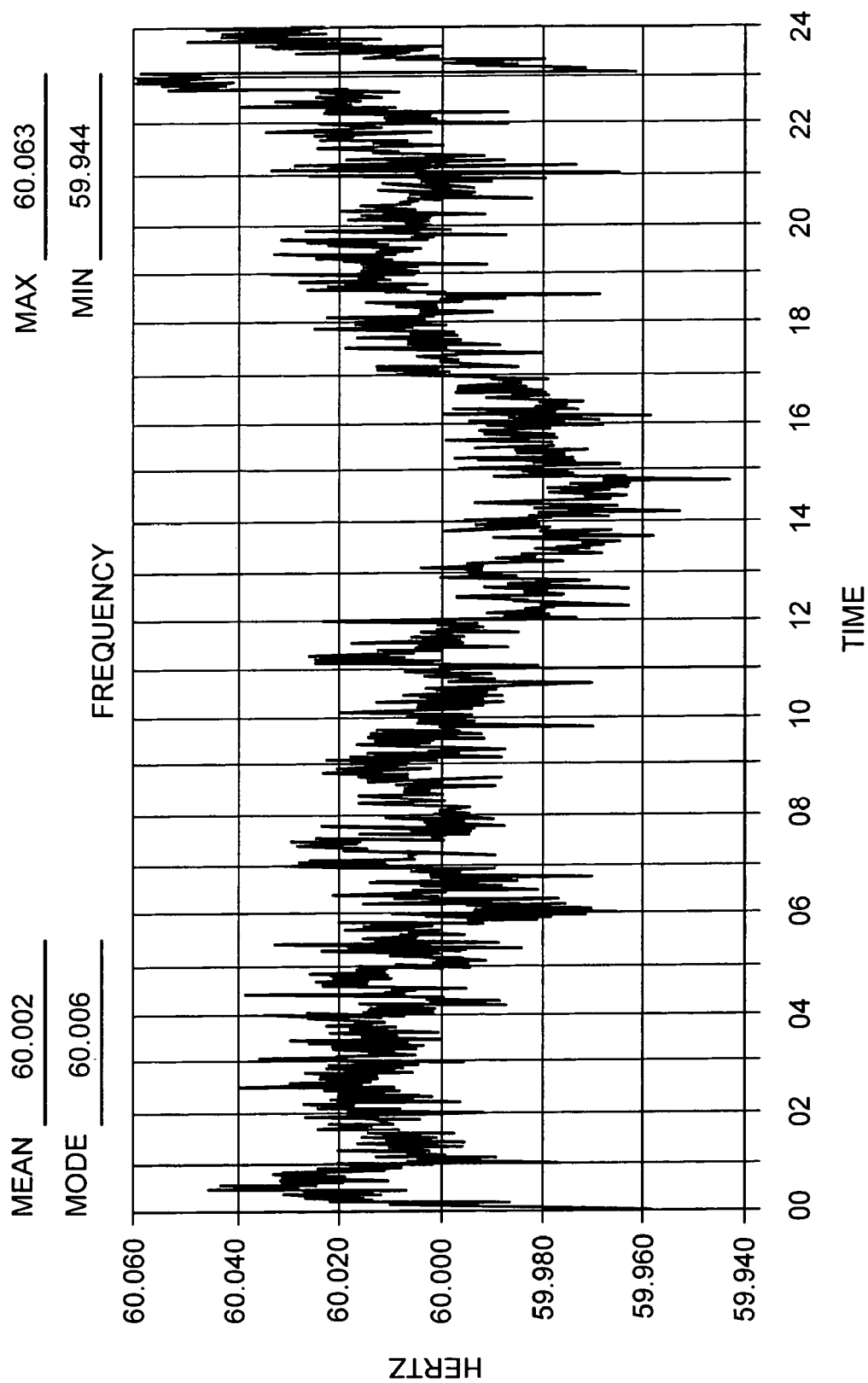
FIG. 2 is an exemplary curve illustrating variation in AC frequency as a function of time over a 24 hour time period.
Figure 3A:
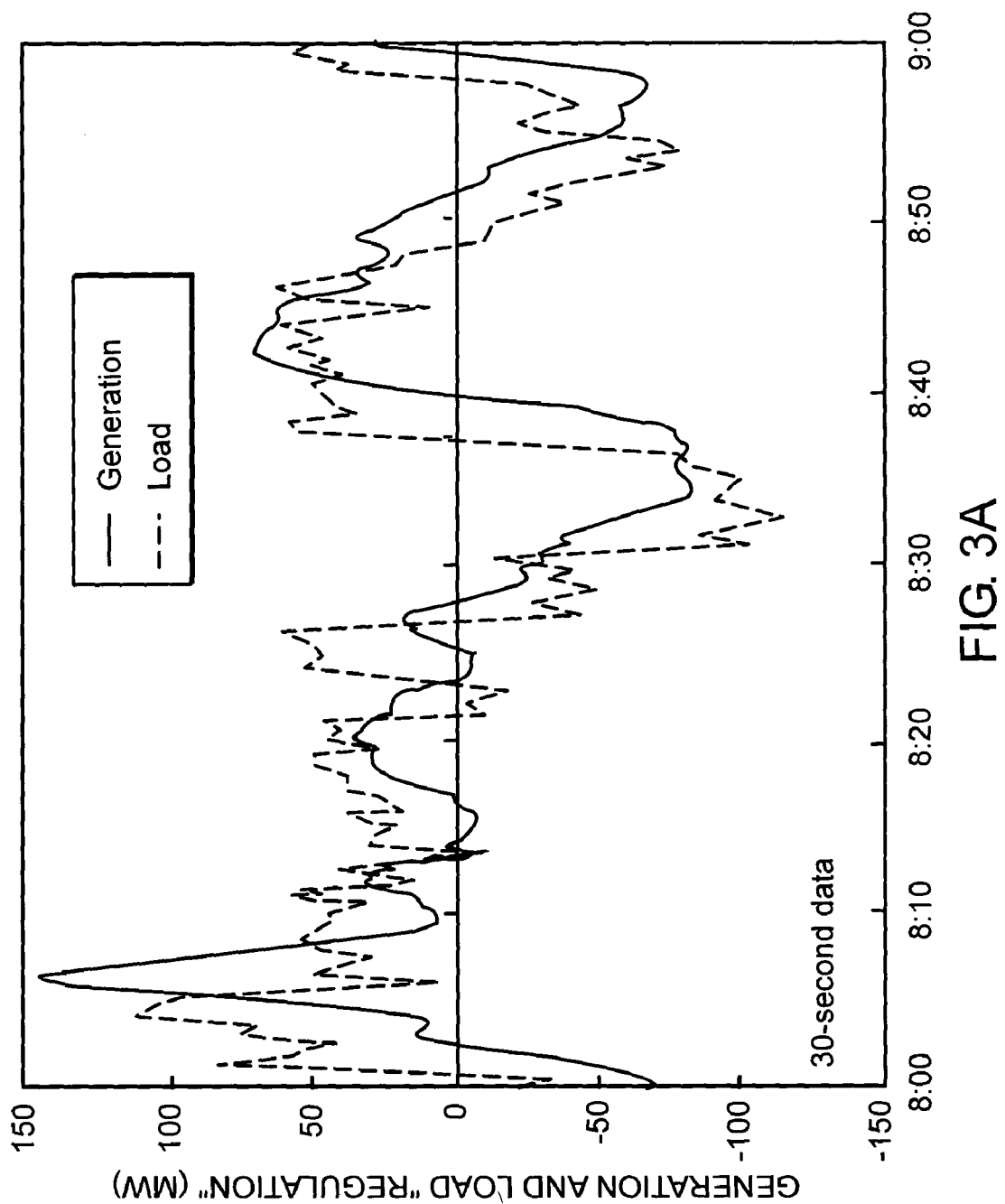
FIG. 3A is graph including generation and load curves for a fossil-fuel power generator with a varying load.
Figure 3B:
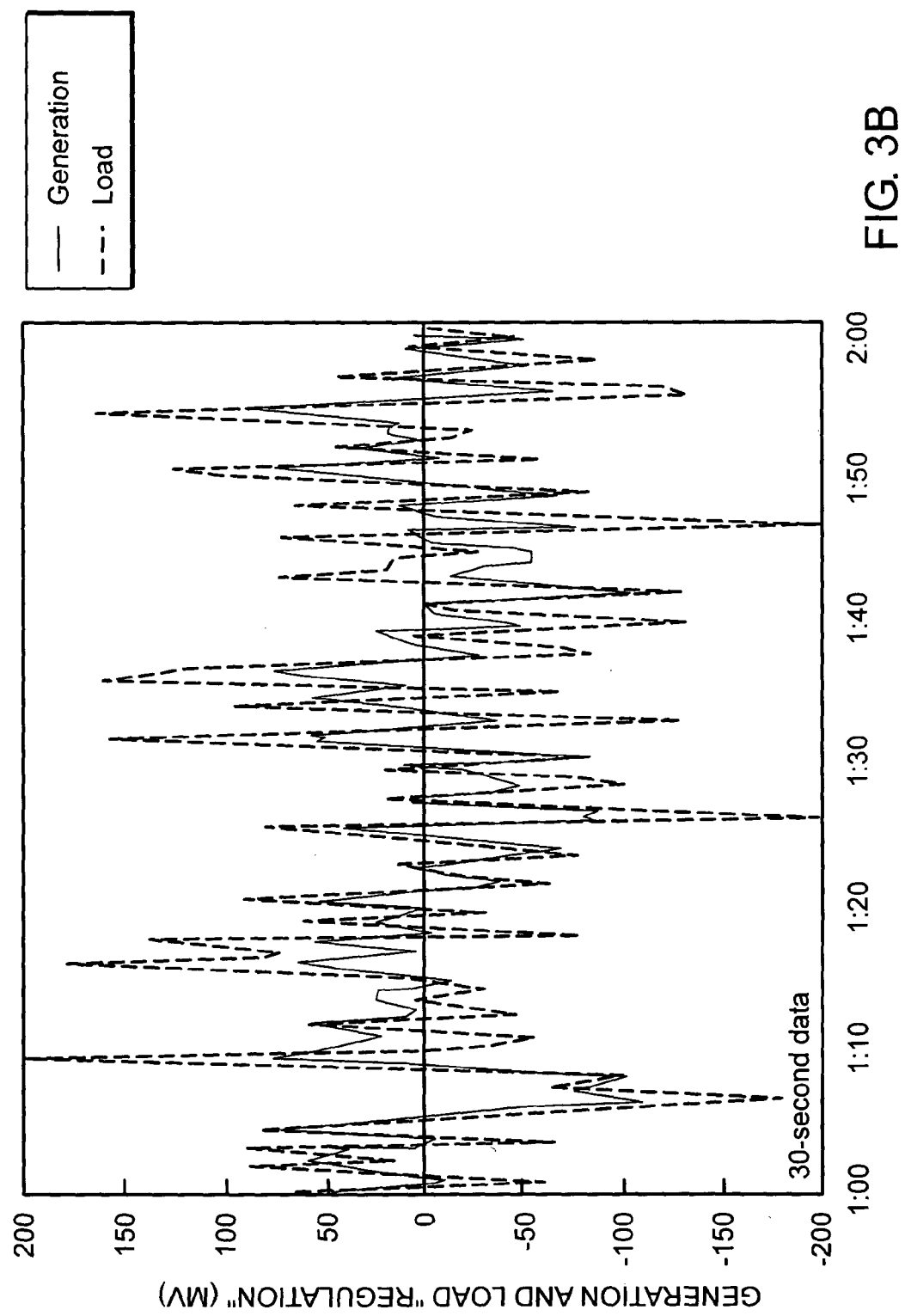
FIG. 3B is a graph including generation and load curves for a pumped Hydro power generator with to a varying load.
Figure 3C:
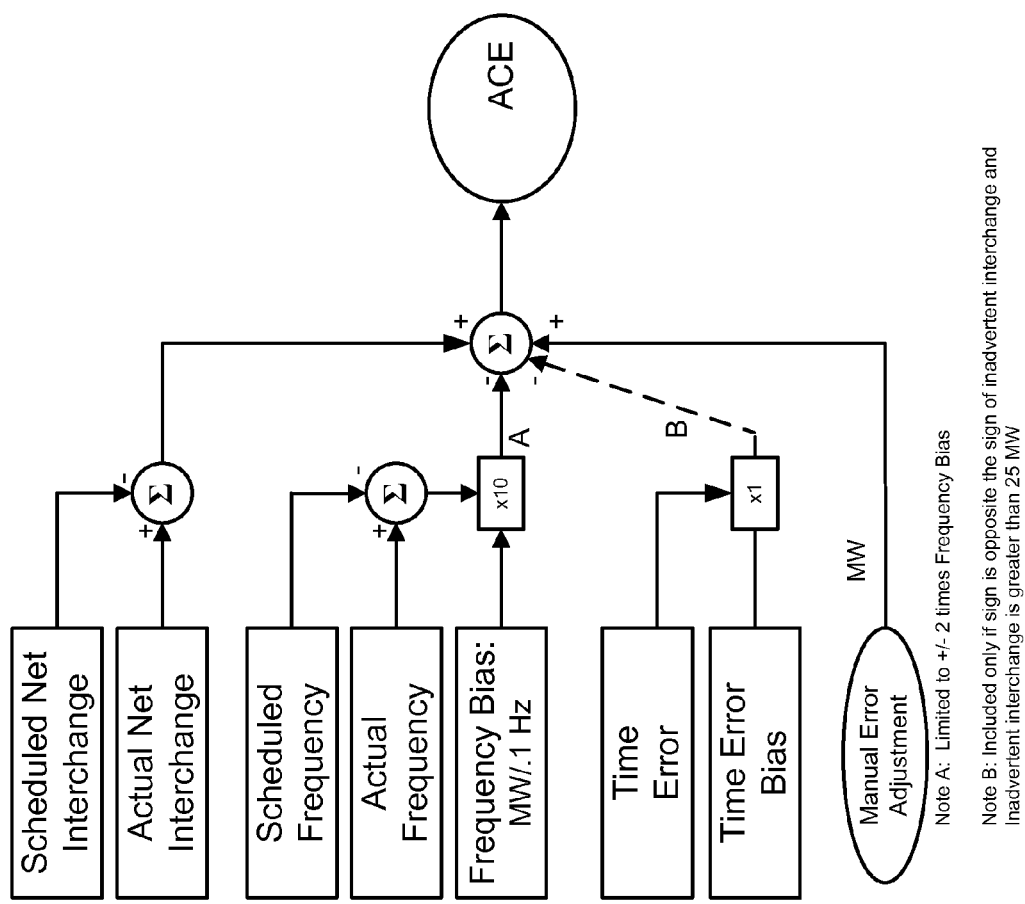
FIG. 3C illustrates an algorithm of one technique for determining area control error.
Figure 13A:
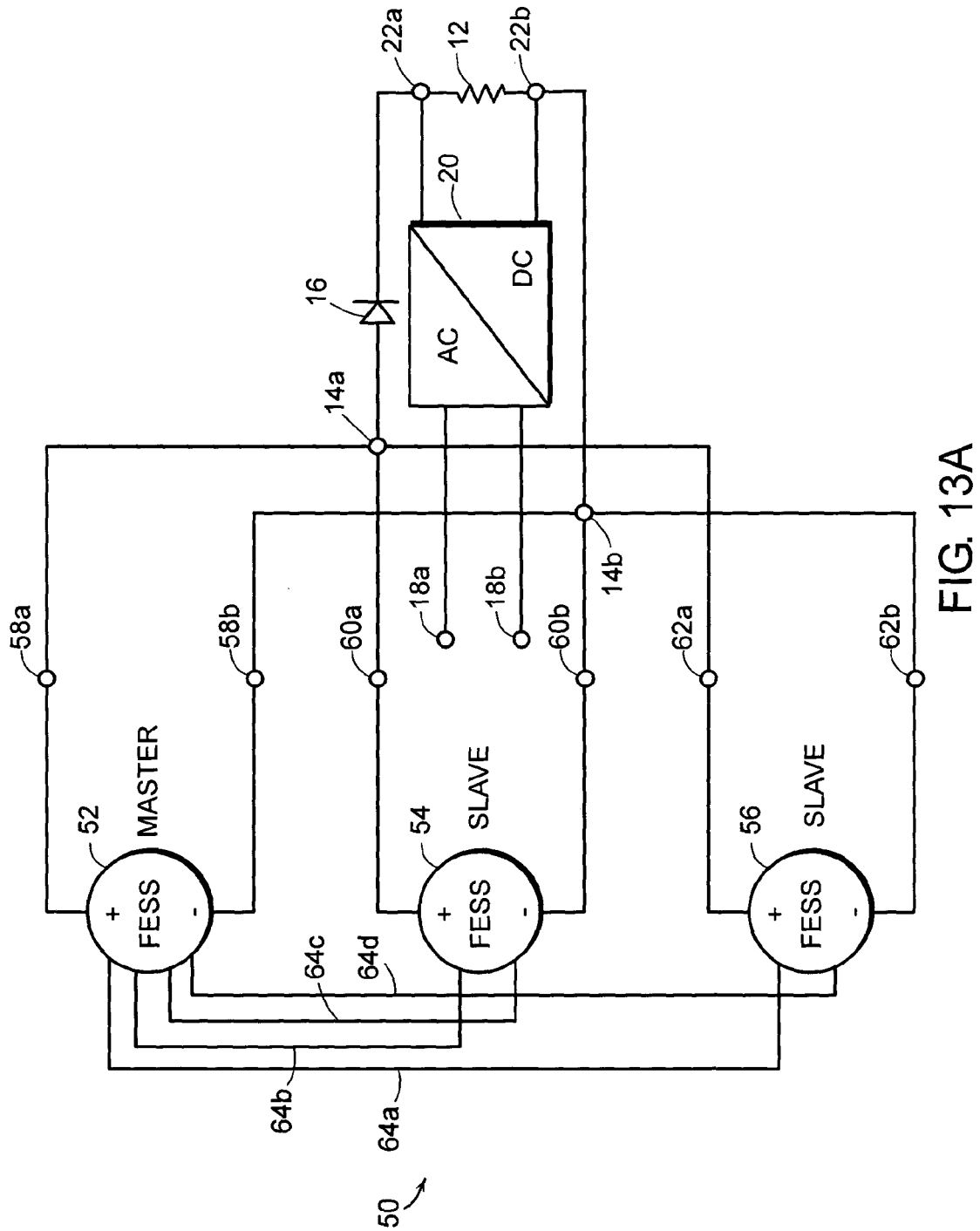
FIG. 13A is a schematic diagram of an array of a multiple of flywheel energy storage systems illustrating a master-slave arrangement.

Referring now to FIG. 13A, there is shown a schematic diagram of an array of a multiple flywheel energy storage system illustrating a conventional master-slave arrangement. In a conventional master-slave arrangement, one of the FESS units is designated the master and to determines the output voltage for all of the FESS units. The other FESS units are slaved to (i.e., controlled by) the master so their output voltage is controlled to a voltage determined by the master. Reference shall be made to the discussion regarding FIGS. 1-2 of U.S. Pat. No. 6,614,132, the teachings of which are incorporated herein by reference as to further details regarding the functions and general design of the master-slave arrangement.

Figure 13B:
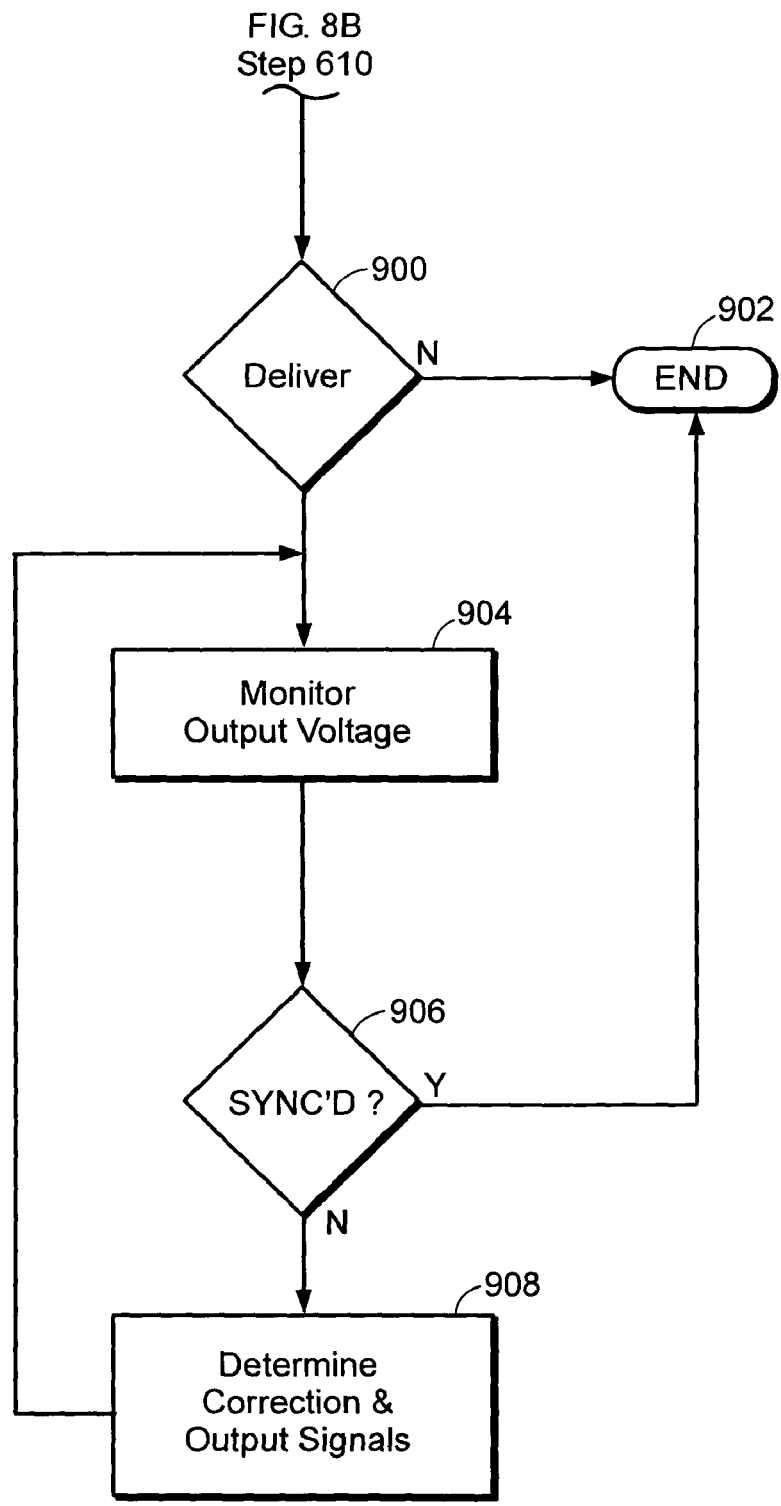
FIG. 13B is a flow diagram illustrating a methodology according to the present invention whereby the FESS array controller controls output voltage.

Referring now to FIG. 13B there is shown a flow diagram illustrating a methodology according to the present invention whereby the FESS array controller 130 controls the output voltage. When the FESS array 100, more particularly the FESS units 120 of the array, are configured to produce power and deliver same to the electrical power distribution network (YES, Step 900), the FESS array controller 130 monitors the output voltage of each of the FESS units, Step 904. This can be accomplished for example, by using the output voltage operational parameter being outputted by the flywheel controller 122.

The output voltage of each FESS unit 120 is evaluated to determine if the output voltages of the FESS units are synchronized or essentially the same. If the voltages are not synchronized, then the array controller 130 determines the appropriate corrected voltage that should be outputted, much like that is done by the master in the master-slave type of arrangement, and the FESS array controller 130 then outputs a signal to each of the FESS units requiring correction, STEP 908. The electronics module 122 of each of the affected FESS units 120 adjusts the operation of the motor/generator 126 responsive to the signal from the controller 130 so that the FESS unit is providing an output voltage at the desired value. In an exemplary embodiment, the FESS array controller 130 determines such a voltage adjustment using one of a predetermined value or by controlling the voltage to correspond to the lowest output voltage for an FESS unit. If the FESS array 100 is not delivering power or the voltages of the FESS units are determined to be synchronized, then the process is ended 902.

Figure 13C:
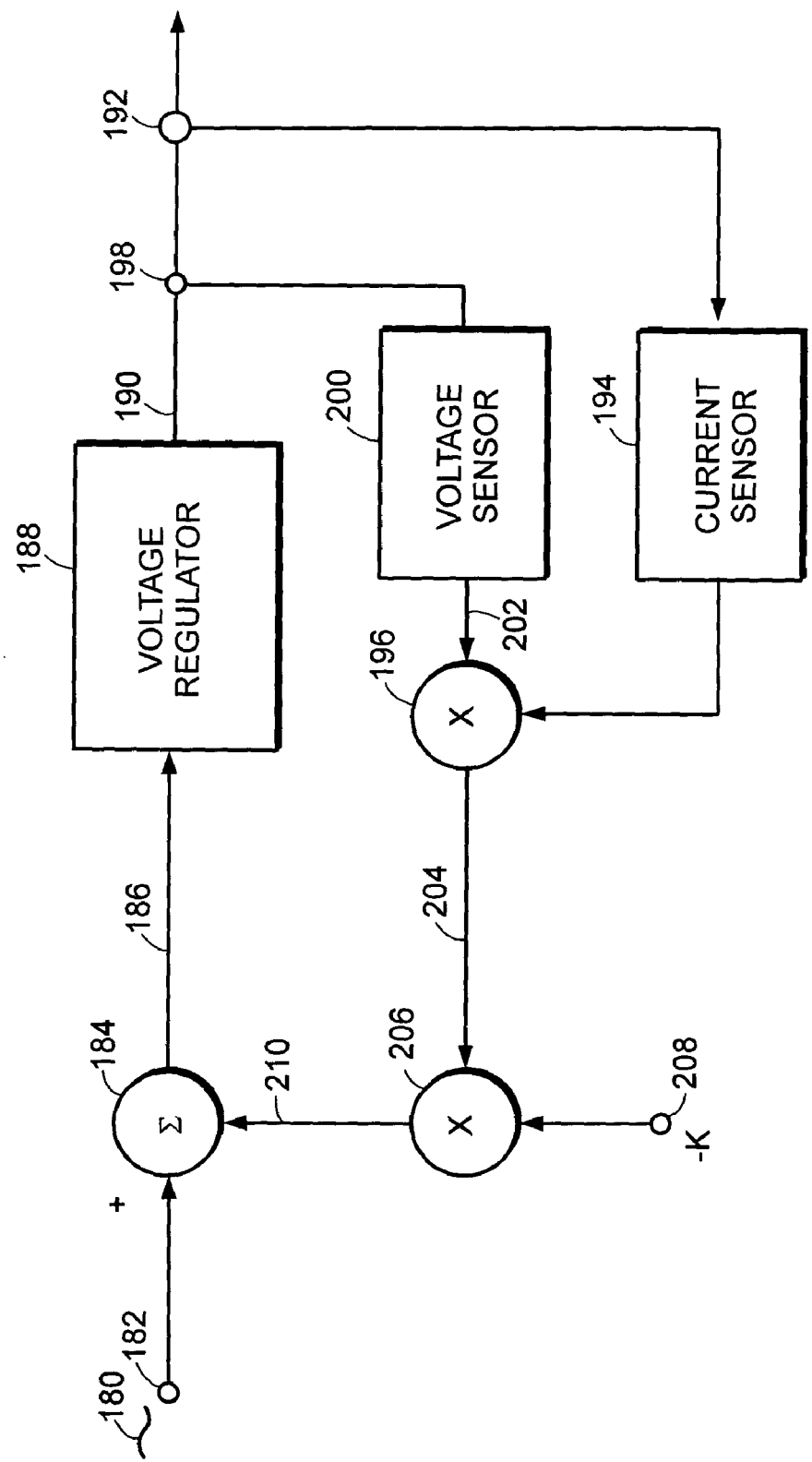
FIG. 13C is a power regulation circuit under the control of a digital signal processor embodied in the FESS electronics module 122.
Figure 13D:
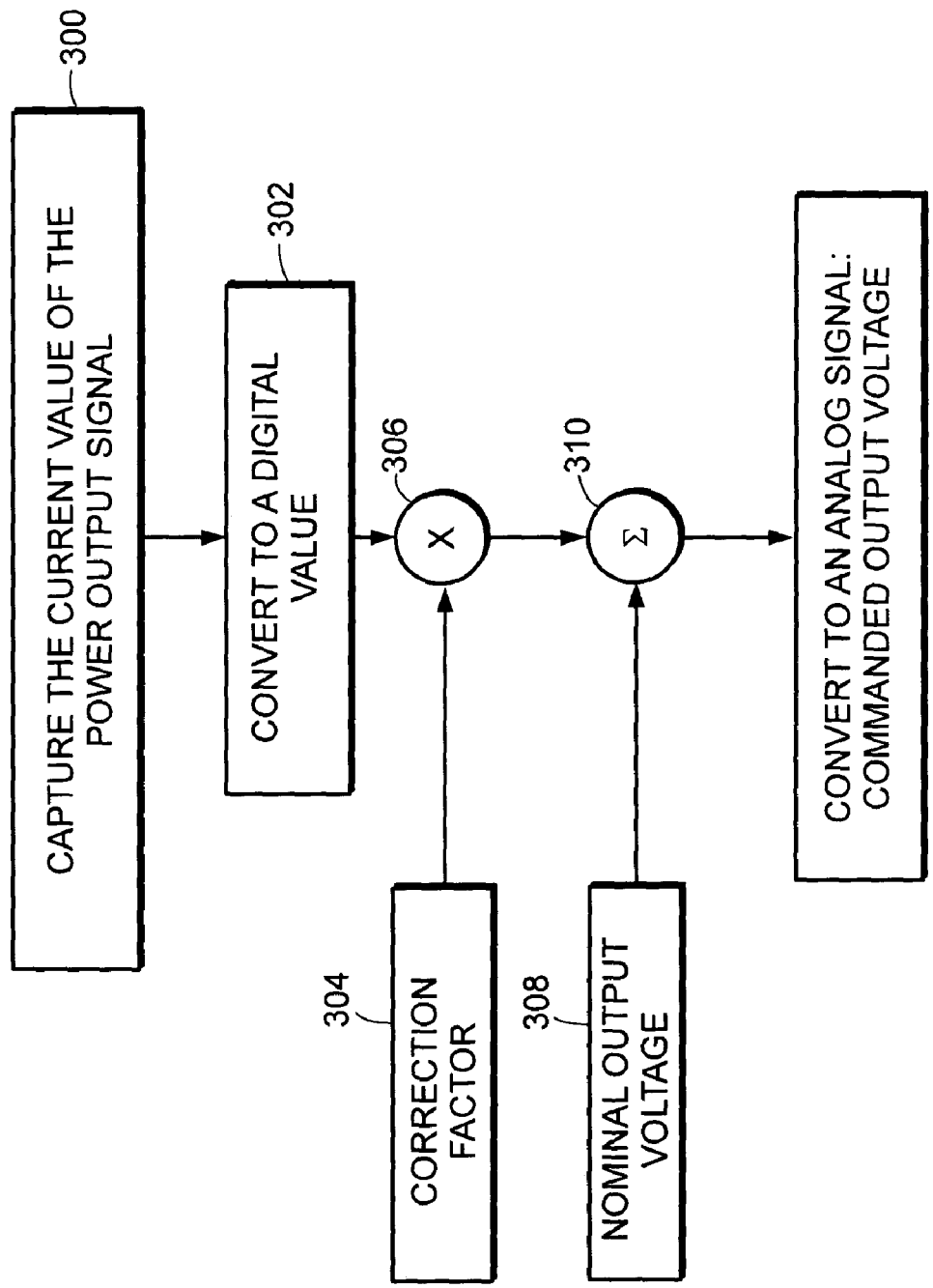
FIG. 13D is a flow diagram of the applications program being executed in the digital signal processor of FIG. 9C.

Referring now to FIGS. 13C, D there is shown a power regulation circuit under the control of a digital signal processor embodied in the FESS flywheel controller 122 (FIG. 13C) and a flow diagram of the applications program being executed in the digital signal processor (FIG. 9D). Reference shall be made to the discussion regarding FIGS. 3-7 of U.S. Pat. No. 6,614,132 and assigned to the assignee of the present invention, the teaching of which are incorporated herein by reference in their entirety, as to further details regarding the functions and design of the power regulation circuit, alternate embodiments thereof and the flow diagram.

In further aspects of the present invention, the FESS array 100 including the FESS units 120 and the array controller 130 are configured and arranged so as to ensure synchronization of the voltage and related characteristics such as phase being outputted from the FESS array with the voltage and related characteristics of the electrical power on the power distribution network.

Although a preferred embodiment of the invention has been described using specific terms, such description is for illustrative purposes only, and it is to be understood that changes and variations may be made without departing from the spirit or scope of the following claims.

INCORPORATION BY REFERENCE

All patents, published patent applications and other references disclosed herein are hereby expressly incorporated by reference in their entireties by reference.

EQUIVALENTS

Those skilled in the art will recognize, or be able to ascertain using no more than routine experimentation, many equivalents of the specific embodiments of the invention described herein. Such equivalents are intended to be encompassed by the following claims.

What is claimed is:

1. In the operation of an electrical utility system having a power distribution grid, said power distribution grid including a plurality of electrical generation facilities and a plurality of electrical loads, which power distribution grid operates based on a conventional method, for regulating AC frequency of electrical power being distributed through said power distribution grid, the frequency regulation method comprising:

configuring said power distribution grid to interconnect said plurality of electrical power generation facilities with one another such that power generated from every one of the power generation facilities is combined, through said grid, to provide said electrical power as a total generated power for distribution, through said grid, to said plurality of electrical loads, and each of said loads exhibits an individual load requirement that varies with time, throughout a given day, at least somewhat independently of at least a number of other ones of said loads, such that all of said loads are combined with one another, through said grid, to define a total system load requirement that varies throughout said given day, and the variation of said total system load requirement includes long term variations defining a daily load curve, and short term variations that fluctuate rapidly, as compared with said long term variations, and at least some of the power generation facilities are adjustable for one of increasing and decreasing said power generated thereby, and each of these adjustable generation facilities exhibits a time lag associated with any adjustment of the power generated thereby, and at least a subset of said adjustable power generation facilities are configured to cooperate with one another for providing an adjustment to said total generated power for at least approximately following said daily load curve, and said adjustment of said total generated power, for following the daily load curve, exhibits a response time, based at least in part on the time lags associated with at least a subset of said adjustable power generation facilities, that is sufficiently long, as compared with at least some of said short term variations, so as to limit an ability of the adjustable power generation facilities to follow the short term variations of said total system load such that said power distribution grid is at least frequently challenged with a conventional mismatch that is caused at least in part by a power difference between said total generated power and said total system load requirement, said power difference having a magnitude that exhibits fluctuations that cause said mismatch to exhibit corresponding fluctuations, at least some of said fluctuations of said power difference being caused by combined variations of a multiplicity of said individual electrical loads, and not by the variation of any single one of said electrical loads, and said independence of the time variations of the individual load requirements causes said fluctuations of said mismatch to be at least generally stochastic such that at least some of the fluctuations of said mismatch are at least generally independent of and uncorrelated with respect to the long term variations of said total load requirement, and repeatedly, throughout said given day, adjusting the total generated power for at least approximately following the long term variations of said total system load, and for attempting to follow said fluctuations of said mismatch, by (i) monitoring said power distribution grid, at each one of a series of monitoring times throughout said given day, for at least approximately characterizing said mismatch at that time, and (ii) for at least some of said monitoring times throughout said given day at least partially compensating for said mismatch, responsive to said monitoring thereof, to regulate said AC frequency, in a conventional way, by adjusting the total power generated such that said AC frequency is caused to fall within a conventional range of a desired frequency value at least during an interval of time that is initiated by said adjustment, a modified method for use in conjunction with said conventional method, said modified method comprising:

providing at least one flywheel energy storage system, said flywheel energy storage system having a power capacity that is at least sufficient for influencing the regulating of said AC frequency of said power distribution grid, electrically coupling the flywheel energy storage system to said power distribution grid, and for at least a number of said monitoring times controlling said flywheel energy storage system, responsive to said monitoring of said mismatch, to further compensate for said mismatch by a selected one of (a) adding power from the flywheel energy storage system to the power distribution grid, and (b) absorbing power by the flywheel energy storage system and from the power distribution grid, such that said flywheel energy storage system provides supplemental regulating of said AC frequency, in addition to said conventional regulating, and with a faster response as compared with the response time of said subset of adjustable power generation facilities.

2. The method of claim 1 wherein the short term variations in said total system load cause said fluctuations of said mismatch to include corresponding short term fluctuations and, at least for some of said number of said monitoring times throughout the given day, the limited response time for adjustment of said total generated power correspondingly limits said attempts to follow the short term fluctuations of said mismatch such that based on said conventional regulation of said AC frequency, the mismatch includes a conventional remaining portion that exhibits at least some of said short term fluctuations, and said stochastic characteristic of said fluctuations in said mismatch causes said short term fluctuations of the conventional remaining portion of said mismatch to exhibit a corresponding stochastic characteristic, and as part of said modified method, for at least one of said number of monitoring times, (a) monitoring said power distribution grid includes at least approximately characterizing said conventional remaining portion of said mismatch, (b) controlling the flywheel energy storage system includes performing said selecting responsive to said characterizing, and (c) for the selection of adding power, specifying a determined amount of power to be added to said power distribution grid, based at least in part on said characterizing of said conventional remaining mismatch, to at least partially compensate for said conventional remaining mismatch, and at least partially compensating for said conventional remaining mismatch by adding the determined amount of power from the flywheel energy storage system to the power distribution grid, and (d) for the selection of absorbing power, specifying a determined amount of power to be absorbed from the power distribution grid, based at least in part on said characterizing of said conventional remaining mismatch, to at least partially compensate for said remaining mismatch, and at least a partially compensating for said conventional remaining mismatch by absorbing the determined amount of power from the distribution grid.

3. The method of claim 2 wherein providing said supplemental regulation of said AC frequency includes at least attempting to follow said short term fluctuations of said conventional remaining portion of said mismatch, by performing steps (a)-(d) for each one of said number of monitoring times.

4. The method of claim 3 including providing a set of power correction signals, responsive to said monitoring of said mismatch, for at least some of said monitoring times and based at least in part on said mismatch, such that each one of said power correction signals can at least to some extent control at least a corresponding one of said adjustable power generation facilities, and configuring said power distribution grid includes configuring each one of the subset of adjustable power generation facilities for receiving the corresponding one of said power correction signals, and adjusting the total generated power includes controlling each one of the subset of adjustable power generation facilities, responsive to its corresponding power correction signal, such that at least some of the power generation facilities, in that subset, cooperate with one another for following said long term variations and for attempting to follow said fluctuations of said mismatch, and in said modified method:

responding to said monitoring by determining a requirement for one of the selection of adding and the selection of absorbing and evaluating the determined amount of power for the selected one of said adding and absorbing, providing said power correction signal includes providing a particular power correction signal, based at least in part on said monitoring at each of said number of monitoring times, and assigning thereto a signal characteristic that can be interpreted for specifying (a) said requirement for one of the selection of adding and the selection of absorbing, and (b) the determined amount of power for the selected one of said adding and said absorbing, and configuring the flywheel energy storage system includes arranging the flywheel energy storage system for receiving at least the particular one of said power correction signals, wherein responding to said monitoring further includes interpreting said characteristic of the particular power correction signal as specifying (a) the requirement for the selecting of one of adding and absorbing, and (b) the determined amount of power for the selected one of said adding and said absorbing.

5. The method of claim 4 wherein providing the particular power correction signal includes producing the particular power correction signal as a regulation signal, and assigning includes designating a value for said regulation signal as said characteristic to be interpreted for said specifying of (a) the requirement for the selection of one of said adding and said absorbing, and the (b) determined amount of power for the selected one of said adding and said absorbing, such that the interpretation of a positive value of the regulation signal specifies the requirement for the selection to add power to the power distribution grid, and the interpretation of a negative value of the regulation signal specifies the requirement for the selection to absorb power, and designating the value of the regulation signal includes assigning a magnitude thereto such said interpretation of said magnitude specifies the determined amount of power for the selected one of said adding and said absorbing.

6. The method of claim 4 wherein said modified method includes customizing the particular power correction signal for use as a customized flywheel power correction signal for controlling one or more of said flywheel energy storage systems, and
    providing said flywheel energy storage system includes arranging an array of one or more energy storage flywheels in electrical communication with a flywheel array controller and configuring the flywheel array controller for (a) receiving the customized flywheel power correction signal and (b) controlling each of the energy storage flywheels in the array, responsive to said customized flywheel power correction signal, to produce said responsiveness with respect to the monitoring of said mismatch.

7. The method of claim 6 wherein customizing the particular power correction signal includes producing the customized flywheel power correction signal as a regulation signal for regulating said flywheel energy storage system, and assigning includes designating a signal value to said customized flywheel regulation signal, as said signal characteristic that is interpretable for said specifying of (a) said requirement for the selection of one of adding and absorbing, and (b) the determined amount of power for the selected one of said adding and said absorbing, such that the interpretation of a positive signal value specifies the requirement for said selection to add power to the power distribution grid, and the interpretation of a negative signal value specifies the requirement for said selection to absorb power, and said designating further includes assigning a magnitude to said signal value such that the interpretation of the magnitude specifies the determined amount of power for the selected one of said addition and said absorption.

8. The method of claim 7 including configuring said flywheel energy storage system for multimode operation such that said power capacity thereof can be provided by (a) operation in a power generating mode, for said adding of power from said flywheel energy storage system to said power distribution grid, within a first predetermined range of power levels up to a maximum addable electrical power that can be added to said grid by said flywheel energy storage system, (b) operation in a charging mode, for said absorbing of power from said power distribution grid, within a second predetermined range of power levels up to a maximum absorbable electrical power that can be absorbed by the flywheel energy storage system, and at any given time during at least a portion of said given day, said flywheel energy storage system stores an amount of energy, and configuring includes arranging the flywheel energy storage system such that operation in said power generating mode causes the amount of stored energy to decrease and operation in said charging mode causes the amount of stored energy to increase, and said flywheel energy storage system exhibits an energy storage capacity as a maximum amount of stored energy that is sufficient for providing said power capacity by handling, at least throughout each interval of time after at least some of said monitoring times, said maximum amount of electrical power for the selected one of said adding and said absorbing during that interval of time,
    wherein assigning the signal value of said customized flywheel regulation signal includes designating the signal value to fall within a range that is delimited by an upper, positive limit and a lower, negative limit, such that the interpretation of a signal value corresponding to the upper positive limit specifies the requirement for the selection to add a predetermined percentage of the maximum addable power as the determined amount of power to be added, and the interpretation of a signal value corresponding to the lowest negative limit specifies the requirement for the selection to absorb a predetermined percentage of the maximum absorbable power as the determined amount of absorbed power.

9. The method of claim 4 wherein configuring the power distribution grid includes (i) locating different ones of the power generation facilities apart from one another at different generator locations in a regional control area, (ii) locating different ones of the loads apart from one another and apart from the power generation facilities, at different load locations within the regional control area, and (iii) providing a network of power lines, as part of said grid, and arranging all of the power lines to cooperate with one another for delivering said total generated power, from said generator locations to said load locations, through the network of power lines, each one of which power lines exhibits an associated line loss, and providing the particular power correction signal includes producing the particular power correction signal, based on said monitoring of said mismatch, at a regional dispatching center having a dispatch location within said electrical power distribution grid, and configuring the power distribution grid includes arranging at least some of said power lines to define a plurality of nodes such that each node serves as an interconnection point for two or more of said power lines and each node is located at a node location, and as part of said modified method, electrically coupling includes locating the flywheel energy storage system at a particular storage system location that at least generally corresponds to a specific one of the node locations and electrically coupling the flywheel energy storage system with that specific node, and wherein the specific node location is sufficiently remote from said dispatch center with one or more of said nodes connectably disposed therebetween, such that no single power line directly connects said dispatch center with said flywheel energy storage system.

10. The method of claim 9 wherein said monitoring includes measuring electrical data, at each of said monitoring times at one or more of said nodes, and electrically communicating said electrical data to said regional dispatch center for reception thereby, and processing said electrical data at said regional dispatching center for producing the particular power correction signal responsive to said electrical data such that said electrical data influences the responsiveness of the flywheel energy storage system.

11. The method of claim 10 wherein processing said electrical data at each of said monitoring times includes evaluating an ACE score associated with the operation of said power distribution grid and providing the particular power correction signal includes basing the particular power correction signal, at least in part, on said ACE score.

12. The method of claim 11 wherein for each of said monitoring times evaluating the ACE score includes designating a scheduled net interchange for said power distribution grid, and said monitoring includes interpreting said electrical data for at least approximately characterizing an actual net interchange, and evaluating the ACE score further includes basing the ACE score at least in part on a comparison between the scheduled net interchange and the actual net interchange.

13. The method of claim 11 wherein for each of said monitoring times evaluating the ACE score includes designating a scheduled AC frequency for electrical power that is to be distributed at least throughout portions of said power distribution grid, and said monitoring includes interpreting said electrical data for at least approximately characterizing an actual AC frequency for electrical power that is distributed throughout said portions of the power distribution grid, and evaluating the ACE score further includes basing the ACE score at least in part on a comparison between the scheduled time error and the actual time error.

14. The method of claim 11 wherein for each of said monitoring times evaluating the ACE score includes designating a scheduled time error for said power distribution grid, and said monitoring includes interpreting said electrical data for at least approximately characterizing an actual time error, and evaluating the ACE score further includes basing the ACE score at least in part on a comparison between the scheduled time error and the actual time error.

15. The method of claim 11 wherein evaluating said ACE score includes designating a manual error adjustment and basing said ACE score at least in part on said manual error adjustment.

16. The method of claim 10 wherein for each of said monitoring times producing the particular power correction signal includes designating a scheduled net interchange for said power distribution grid, and said monitoring includes interpreting said electrical data for at least approximately characterizing an actual net interchange, and producing the particular power correction signal further includes basing the particular power correction signal at least in part on a comparison between the scheduled net interchange and the actual net interchange.

17. The method of claim 10 wherein for each of said monitoring times producing the particular power correction signal includes designating a scheduled AC frequency for electrical power that is to be distributed at least throughout portions of said power distribution grid, and said monitoring includes at interpreting said electrical data for least approximately characterizing an actual AC frequency for electrical power that is distributed throughout said portions of the power distribution grid and producing the particular power correction signal further includes basing the particular power correction signal at least in part on a comparison between the scheduled net interchange and the actual net interchange.

18. The method of claim 10 wherein for each of said monitoring times producing the particular power correction signal includes designating a scheduled time error for said power distribution grid, and said monitoring includes interpreting said electrical data for at least approximately characterizing an actual time error, and producing the particular power correction signal further includes basing the particular power correction signal at least in part on a comparison between the scheduled time error and the actual time error.

19. The method of claim 1 including configuring said flywheel energy storage system for multimode operation such that said power capacity thereof can be provided by (a) operation in a power generating mode, for said adding of power from said flywheel energy storage system to said power distribution grid, within a first predetermined range of power levels up to a maximum addable electrical power that can be added to said grid by said flywheel energy storage system, (b) operation in a charging mode, for said absorbing of power from said power distribution grid, within a second predetermined range of power levels up to a maximum absorbable electrical power that can be absorbed by the flywheel energy storage system, and at any given time during at least a portion of said given day, said flywheel energy storage system stores an amount of energy, and configuring includes arranging the flywheel energy storage system such that operation in said power generating mode causes the amount of stored energy to decrease and operation in said charging mode causes the amount of stored energy to increase, and said flywheel energy storage system exhibits an energy storage capacity as a maximum amount of stored energy that is sufficient for providing said power capacity by handling, at least throughout each interval of time after at least some of said monitoring times, the maximum amount of electrical power for the selected one of said adding and said absorbing during that interval of time.

20. The method of claim 19 wherein configuring said flywheel energy storage system for multimode operation further includes configuring the flywheel energy storage system for operation in a standby mode, in which standby mode said flywheel energy storage system performs neither one of said adding and said absorbing, at least to within an approximation, and at other ones of said monitoring times, during which other times neither one of said adding and said absorbing is selected, controlling said flywheel energy storage system responsive to said monitoring of said mismatch includes operating said flywheel energy storage system in said standby mode.

21. The method of claim 1 including providing a set of power correction signals, responsive to said monitoring of said mismatch, for at least some of said monitoring times and based at least in part on said mismatch, such that each one of said power correction signals can at least to some extent control at least a corresponding one of said adjustable power generation facilities, and configuring said power distribution grid includes configuring each one of the subset of adjustable power generation facilities for receiving the corresponding one of said power correction signals, and adjusting the total generated power includes controlling each one of the subset of adjustable power generation facilities, responsive to its corresponding power correction signal, such that at least some of the power generation facilities, in that subset, cooperate with one another for following said long term variations and for attempting to follow said fluctuations of said mismatch, and as part of said modified method:
providing said power correction signals further includes providing a particular power correction signal, based at least in part on said monitoring at each of said number of monitoring times, and providing the flywheel energy storage system includes configuring the flywheel energy storage system to receive at least the particular power correction signal, and to respond to the particular power correction signal to produce said responsiveness with respect to the monitoring of said mismatch.

22. The method of claim 21 wherein said monitoring includes at least approximately evaluating operation of the power distribution grid, at each of said monitoring times, based on a specific one of three operating states including a state of over generation wherein the total generated power exceeds the total system load, a state of under generation wherein the total system load exceeds the total generated power, and a balanced state wherein the total generated power and the total system load are at least approximately balanced; and (a) at least for said number of said monitoring times, providing the particular power correction signal includes generating the particular power correction signal based at least in part on said approximate evaluating, such that (i) for each one of a first subset of said number of monitoring times established by evaluating that grid operation at that monitoring time is in the state of over generation, assigning to the particular power correction signal a signal characteristic that can be interpreted for specifying a determined amount of excess generated power to be absorbed from the power distribution grid, by the flywheel energy storage system, for providing said flywheel frequency regulating, and (ii) for each one of a second subset of said number of monitoring times established by evaluating that grid operation at that monitoring time is the state of under generation, assigning to the particular power correction signal a signal characteristic that can be interpreted for specifying a determined amount of excess load power to be added to the power distribution grid, by the flywheel energy storage system, for providing said flywheel frequency regulating, and (b) as part of controlling the flywheel energy storage system, for each one of the number of monitoring times, responding to the particular power correction signal includes basing the absorbed power and the added power on the particular power correction signal such that (i) for at least one of the first subset of monitoring times, each corresponding to evaluating that grid operation at that monitoring time is in the state of over generation, controlling the flywheel energy storage system includes responding to the particular power correction signal by interpreting the signal characteristic to specify the determined amount of power to be absorbed from the power distribution grid, and performing said absorbing through operating the flywheel energy system in a charging mode, associated with the state of over generation, in which mode said flywheel energy storage system absorbs approximately the determined amount of excess power, from said grid during at least part of a corresponding one of the intervals after each monitoring time of said first subset of monitoring times, (ii) for at least one of the second subset of the number of monitoring times, each corresponding to evaluating that grid operation at that monitoring time is the state of under generation, controlling the flywheel energy storage system includes responding to the particular power correction signal by interpreting the signal characteristic to specify the determined amount of power to be added to the grid, and performing said adding through operating said flywheel in a power generation mode, associated with the state of under generation, in which mode said flywheel energy storage system adds approximately the determined amount of excess load power, to said grid, during at least part of a corresponding one of the intervals after each monitoring time of said second subset of monitoring times.

23. The method of claim 22 wherein controlling the flywheel energy storage system for the balanced state of operation includes operating the flywheel energy storage system, responsive to the particular power correction signal, in a standby mode, associated with the balanced state.

24. The method of claim 22 wherein providing said supplemental regulation of said AC frequency includes following said fluctuations of said mismatch by performing steps (a) and (b) for each one of said number of monitoring times.

25. The method of claim 24 wherein, at a current one of the number of monitoring times, the power distribution grid is in a current one of the three states, at least based on the approximate evaluation, and the power distribution grid remains in said current state for a finite length of time, and after that finite length of time, the mismatch causes operation of the distribution grid to change from the current state to a new state that is a different one of the three states, and the stochastic characteristic of said fluctuations of said mismatch causes a sufficient degree of randomness with respect to the state of the power distribution grid such that said finite length of time is at least generally unpredictable and at least in some cases of said change, from the current state to the new state, that are caused by an associated one of said fluctuations of said mismatch, the new state is at least generally unpredictable, and providing the particular power correction signal includes (a) at an additional monitoring time after said finite length of time, performing an additional evaluation of the state of operation of the power distribution grid for determining that the state of operation of the power distribution grid has changed in said unpredictable way, responsive to a particular fluctuation of said mismatch, to said new state and (b) responsive to the additional evaluation of the new state of operation of the power distribution grid, modifying said signal characteristic of said particular power correction signal for providing an additional particular power correction signal having a new signal characteristic assigned thereto based on the additional evaluation of the new state of said power distribution grid, wherein for the change in the state of operation of the power distribution grid, caused by the associated fluctuation of said mismatch, said modified method further comprises additionally responding to the additional evaluation for providing additional flywheel regulating of said AC frequency by operating the flywheel energy storage system for following the associated fluctuation of the mismatch responsive to the modification of the particular power correction signal in part by correspondingly modifying the mode of operation of the flywheel energy storage system, from the flywheel system operating mode associated with said current state, to a new flywheel system operating mode that is associated with the new state such that for an additional interval of time, after the additional monitoring time, such that the flywheel energy storage system operates in the new flywheel system operating mode.

26. The method of claim 25 including following said fluctuations of said mismatch by repeatedly performing said additional monitoring and repeatedly changing said signal characteristic of the particular power correction signal responsive thereto, and repeatedly responding to each change in said characteristic of said power correction signal.

* * * * *

(12) EX PARTE REEXAMINATION CERTIFICATE (9284th)
United States Patent
Capp et al.

(10) Number: US 8,008,804 C1
(45) Certificate Issued: Sep. 4, 2012

(54) METHODS, SYSTEMS AND APPARATUS FOR REGULATING FREQUENCY OF GENERATED POWER USING FLYWHEEL ENERGY STORAGE SYSTEMS WITH VARYING LOAD AND/OR POWER GENERATION

(75) Inventors: F. William Capp, Minneapolis, MN (US); Matthew L. Lazarewicz, Boxford, MA (US); A. James Arseneaux, Westford, MA (US); Paul Dresens, Wayland, MA (US); Hernan Alex Rojas, Salem, NH (US)

(73) Assignee: Beacon Power Corporation, Tyngsboro, MA (US)

Reexamination Request:
  No. 90/012,185, Apr. 10, 2012

Reexamination Certificate for:
  Patent No.: 8,008,804
  Issued: Aug. 30, 2011
  Appl. No.: 10/920,146
  Filed: Aug. 16, 2004

(51) Int. Cl.
  *H02J 3/38* (2006.01)
  *H02J 3/00* (2006.01)

(52) U.S. Cl. ................ 307/44; 307/80; 307/85
(58) Field of Classification Search .............. None
  See application file for complete search history.

(56) References Cited

To view the complete listing of prior art documents cited during the proceeding for Reexamination Control Number 90/012,185, please refer to the USPTO's public Patent Application Information Retrieval (PAIR) system under the Display References tab.

*Primary Examiner* — Pia Tibbits

(57) ABSTRACT

Featured are methods for regulating the AC frequency of the electrical power be supplied on an electrical distribution system or grid. Such a method includes electrically coupling an energy storage sub-system to the electrical distribution network, where the energy storage sub-system includes one or more flywheel energy storage systems. Also featured as devices, systems and apparatuses embodying such methodologies or for use in implementing such methodologies of the present invention.

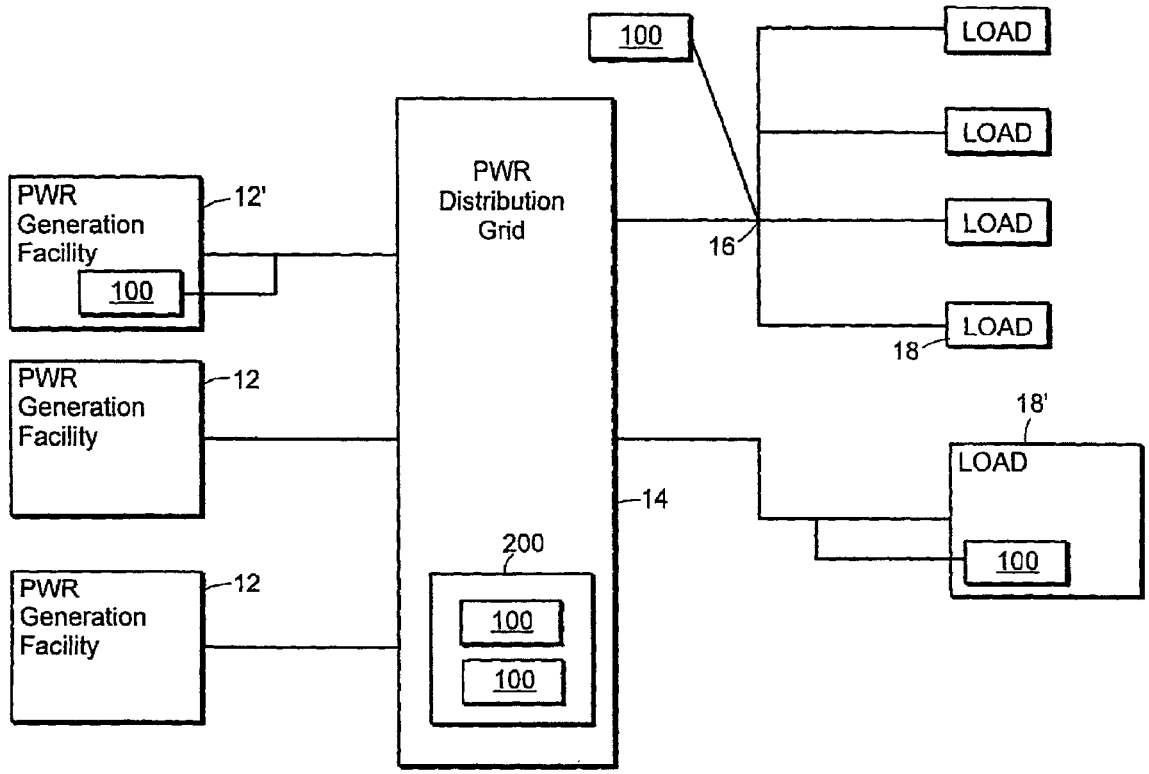

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-26 is confirmed.

* * * * *